(12) United States Patent
Mohseni et al.

(10) Patent No.: US 12,731,201 B2
(45) Date of Patent: Sep. 8, 2026

(54) SYSTEMS AND METHODS FOR ROUTING MACHINE-LEARNING PROMPTS IN A DISTRIBUTED NETWORKING ENVIRONMENT

(71) Applicant: DK Crown Holdings Inc., Boston, MA (US)

(72) Inventors: Robin Mohseni, Billericay (GB); Gengyuan Zhang, Boston, MA (US); Gregory Von Pless, Melrose, MA (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 19/360,383

(22) Filed: Oct. 16, 2025

(65) Prior Publication Data

US 2026/0111463 A1 Apr. 23, 2026

Related U.S. Application Data

(60) Provisional application No. 63/741,671, filed on Jan. 3, 2025, provisional application No. 63/741,297, filed (Continued)

(51) Int. Cl.
*G06F 40/30* (2020.01)
*G06F 16/3329* (2025.01)

(52) U.S. Cl.
CPC ........ *G06F 16/33295* (2025.01); *G06F 40/30* (2020.01)

(58) Field of Classification Search
CPC .......................... G06F 16/33295; G06F 40/30
See application file for complete search history.

(56) References Cited

U.S. PATENT DOCUMENTS

| | | | |
|---|---|---|---|
| 9,558,620 | B2 | 1/2017 | Froy et al. |
| 10,311,670 | B2 | 6/2019 | Brahmandam et al. |

(Continued)

FOREIGN PATENT DOCUMENTS

| | | | |
|---|---|---|---|
| CN | 116310582 | A | 6/2023 |
| WO | WO-2023/064563 | A1 | 4/2023 |

(Continued)

OTHER PUBLICATIONS

Cureton, et al., "Federated learning for intent classification." In 2023 IEEE 19th International Conference on Intelligent Computer Communication and Processing (ICCP), pp. 315-322. IEEE, 2023. (Year: 2023).

(Continued)

*Primary Examiner* — Daniel C Washburn
*Assistant Examiner* — Penny L Caudle
(74) *Attorney, Agent, or Firm* — Foley & Lardner LLP

(57) ABSTRACT

Described herein are systems and methods for monitoring and evaluating language performance according to real-time data in a distributed networking environment. A system can receive, from a client device, a prompt for a communication session. The system can determine, based on the prompt, a classification of an intent corresponding to a first output type of multiple output types. A first language model of a plurality of language models can be selected based on the classification of the intent, the first language model being associated with a first intent type and selected in response to the classification matching the first intent type. The system can generate an output message using the first language model and the prompt, the output message comprising text data that is responsive to the prompt.

20 Claims, 4 Drawing Sheets

Related U.S. Application Data on Jan. 2, 2025, provisional application No. 63/719,406, filed on Nov. 12, 2024, provisional application No. 63/711,415, filed on Oct. 24, 2024, provisional application No. 63/708,528, filed on Oct. 17, 2024, provisional application No. 63/708,542, filed on Oct. 17, 2024, provisional application No. 63/708,504, filed on Oct. 17, 2024, provisional application No. 63/708,554, filed on Oct. 17, 2024, provisional application No. 63/708,492, filed on Oct. 17, 2024, provisional application No. 63/708,509, filed on Oct. 17, 2024.

(56) References Cited

U.S. PATENT DOCUMENTS 10,825,303 B2 11/2020 Mcdonald et al.
10,950,086 B2 3/2021 Brahmandam et al.
11,094,171 B2 8/2021 Huke et al.
11,704,000 B1 7/2023 Mcivor et al.
11,735,006 B2 8/2023 Nelson et al.
11,756,379 B2 9/2023 Huke et al.
11,763,637 B2 9/2023 Huke et al.
11,776,362 B2 10/2023 Nelson et al.
11,785,280 B1 10/2023 Dakss et al.
12,008,862 B2 6/2024 Inamdar et al.
12,067,039 B1 8/2024 Campos et al.
12,067,849 B2 8/2024 Storm et al.
12,079,449 B2 9/2024 McIvor et al.
12,118,320 B2 10/2024 Gelfenbeyn et al.
12,128,288 B1 10/2024 Redman et al.
12,190,683 B2 1/2025 Huke et al.
12,307,861 B1 * 5/2025 Todisco .................. G06F 40/58
12,322,246 B2 6/2025 Turner
12,361,796 B2 7/2025 Joao
12,444,266 B2 10/2025 Joao
12,457,239 B1 10/2025 Mantin et al.
12,477,036 B1 11/2025 Tenbuuren et al.
2002/0068633 A1 6/2002 Schlaifer
2008/0311981 A1 12/2008 Schugar et al.
2010/0121808 A1 5/2010 Kuhn
2010/0328066 A1 12/2010 Walker et al.
2012/0034974 A1 2/2012 Amaitis et al.
2012/0310926 A1 12/2012 Gannu et al.
2013/0274007 A1 10/2013 Hilbert et al.
2014/0024435 A1 1/2014 Scott
2014/0289236 A1 9/2014 Agarwal et al.
2015/0038236 A1 2/2015 Robbins et al.
2015/0339884 A1 11/2015 Chun
2016/0086441 A1 3/2016 Cohen et al.
2016/0155350 A1 6/2016 Dragicevic et al.
2016/0189483 A1 6/2016 Ballman
2016/0196723 A1 7/2016 Ballman
2018/0068661 A1 3/2018 Printz
2018/0204417 A1 7/2018 Triplett
2018/0225911 A1 8/2018 Washington et al.
2019/0012876 A1 1/2019 Brahmandam et al.
2019/0122482 A1 4/2019 Amaitis et al.
2019/0318582 A1 10/2019 Barak
2019/0325028 A1 10/2019 Palanichamy et al.
2019/0361966 A1 11/2019 Munro et al.
2019/0362601 A1 11/2019 Kline et al.
2019/0392684 A1 12/2019 Mcdonald et al.
2020/0027314 A1 1/2020 Pilnock et al.
2020/0118040 A1 4/2020 Dey et al.
2020/0234543 A1 7/2020 Schwartz et al.
2021/0049490 A1 2/2021 Hood
2021/0118264 A1 4/2021 Nelson et al.
2021/0217277 A1 7/2021 Huke et al.
2021/0217278 A1 7/2021 Huke et al.
2021/0233344 A1 7/2021 Amaitis et al.
2021/0248707 A1 8/2021 Huke et al.
2021/0248875 A1 8/2021 Huke et al.
2021/0256650 A1 8/2021 Huke et al.
2021/0272415 A1 9/2021 Huke et al.
2021/0280006 A1 9/2021 Pace
2021/0299882 A1 9/2021 Cupersmith et al.
2021/0319666 A1 10/2021 Salivar et al.
2021/0319668 A1 10/2021 Huke et al.
2021/0342550 A1 11/2021 Palanichamy et al.
2021/0343122 A1 11/2021 Warren
2021/0375090 A1 12/2021 Huke et al.
2021/0383645 A1 12/2021 Gupta et al.
2022/0019950 A1 1/2022 Sabri
2022/0122601 A1 4/2022 Cronin
2022/0139160 A1 5/2022 Huke et al.
2022/0148364 A1 5/2022 Huke et al.
2022/0148365 A1 5/2022 Huke et al.
2022/0157114 A1 5/2022 Huke et al.
2022/0165118 A1 5/2022 Huke et al.
2022/0165120 A1 5/2022 Huke et al.
2022/0172560 A1 6/2022 Huke et al.
2022/0188366 A1 6/2022 Song et al.
2022/0188672 A1 6/2022 Basch et al.
2022/0189238 A1 6/2022 Huke et al.
2022/0270432 A1 8/2022 Mendell et al.
2022/0351568 A1 11/2022 Smith
2022/0358808 A1 11/2022 Huke et al.
2022/0417603 A1 12/2022 Pleiman
2023/0011114 A1 1/2023 Guy et al.
2023/0082553 A1 3/2023 Mendell
2023/0124722 A1 4/2023 Polson et al.
2023/0162563 A1 5/2023 Turner
2023/0185579 A1 6/2023 Eranpurwala et al.
2023/0196871 A1 6/2023 Inamdar et al.
2023/0252848 A1 8/2023 Isgar
2023/0259714 A1 8/2023 Lange
2023/0267805 A1 8/2023 Edsall
2023/0350928 A1 11/2023 Hill et al.
2023/0351845 A1 11/2023 Mendell et al.
2023/0360488 A1 11/2023 Alyekhin
2023/0360489 A1 * 11/2023 Alyekhin ............ G07F 17/3288
2023/0360490 A1 11/2023 Alyekhin
2023/0360494 A1 11/2023 Alyekhin
2023/0394930 A1 12/2023 Shore et al.
2023/0410591 A1 12/2023 Monteverdi
2024/0029511 A1 1/2024 Teruuchi
2024/0086648 A1 3/2024 Han et al.
2024/0086773 A1 3/2024 Oppenheimer
2024/0105024 A1 3/2024 Huke et al.
2024/0282296 A1 8/2024 Bhathena et al.
2024/0290169 A1 8/2024 Inamdar et al.
2024/0312312 A1 9/2024 Flint
2024/0320510 A1 * 9/2024 Kundu .................. G06N 3/096
2024/0346256 A1 10/2024 Qin
2024/0350924 A1 10/2024 Orlow
2024/0362409 A1 10/2024 Kuan
2024/0362968 A1 10/2024 Lyons et al.
2024/0362973 A1 10/2024 Owoyemi
2024/0367054 A1 11/2024 Nelson et al.
2024/0378251 A1 11/2024 Boyd
2024/0378940 A1 11/2024 Latifi et al.
2024/0403845 A1 12/2024 O'Hanlon et al.
2024/0412058 A1 12/2024 Mayande et al.
2024/0428700 A1 12/2024 Asgekar et al.
2025/0046150 A1 2/2025 Huke et al.
2025/0077913 A1 3/2025 Vodeniktov et al.
2025/0086190 A1 3/2025 Azarmi
2025/0094143 A1 3/2025 Huang
2025/0094708 A1 3/2025 Cunningham et al.
2025/0095438 A1 3/2025 Russ et al.
2025/0103624 A1 3/2025 Carta et al.
2025/0118151 A1 4/2025 Williams
2025/0118156 A1 4/2025 Jovanovic
2025/0124063 A1 4/2025 Isslieb et al.
2025/0124340 A1 4/2025 Ni et al.
2025/0140075 A1 5/2025 Groset et al.
2025/0157284 A1 5/2025 Wolfe et al.
2025/0161811 A1 5/2025 Assaad et al.
2025/0174083 A1 5/2025 Huke et al.
2025/0191437 A1 6/2025 Hanson et al.
2025/0191440 A1 6/2025 Bradley et al.
2025/0209891 A1 6/2025 Jacquet et al.
2025/0232126 A1 7/2025 Ma et al.

(56) References Cited

U.S. PATENT DOCUMENTS

| | | | | |
|---|---|---|---|---|
| 2025/0238449 | A1 | 7/2025 | Sharma et al. | |
| 2025/0265310 | A1 | 8/2025 | Barnes | |
| 2025/0278633 | A1 | 9/2025 | Smith et al. | |
| 2025/0291866 | A1 | 9/2025 | Park et al. | |
| 2025/0294091 | A1 | 9/2025 | Mukherjee et al. | |
| 2025/0299053 | A1* | 9/2025 | Cuomo .................. | G06N 3/091 |
| 2025/0299536 | A1 | 9/2025 | Chun et al. | |
| 2025/0307302 | A1 | 10/2025 | Kolugur et al. | |
| 2025/0307572 | A1 | 10/2025 | Shtar et al. | |
| 2025/0307639 | A1 | 10/2025 | Jin et al. | |
| 2025/0316134 | A1 | 10/2025 | Vaccaro | |
| 2025/0316139 | A1 | 10/2025 | Vaccaro | |
| 2025/0316145 | A1 | 10/2025 | Merati | |
| 2025/0322092 | A1 | 10/2025 | Troiani et al. | |
| 2025/0322168 | A1 | 10/2025 | Sharma | |
| 2025/0322295 | A1 | 10/2025 | Brin et al. | |
| 2025/0329218 | A1 | 10/2025 | Russ et al. | |
| 2025/0348580 | A1 | 11/2025 | Galinkin | |
| 2025/0355929 | A1 | 11/2025 | Lara Silva et al. | |
| 2025/0356725 | A1 | 11/2025 | Nowak | |
| 2025/0363856 | A1 | 11/2025 | Turner et al. | |
| 2025/0391250 | A1 | 12/2025 | Todisco et al. | |
| 2026/0024524 | A1 | 1/2026 | Perkins et al. | |

FOREIGN PATENT DOCUMENTS

| | | | |
|---|---|---|---|
| WO | WO-2023/140642 | A1 | 7/2023 |
| WO | WO-2024/194418 | A1 | 9/2024 |
| WO | WO-2025/019764 | A1 | 1/2025 |
| WO | WO-2025/042386 | A1 | 2/2025 |

OTHER PUBLICATIONS

Non-Final Office Action on U.S. Appl. No. 19/357,856 dtd Jan. 2, 2026.

Non-Final Office Action on U.S. Appl. No. 19/357,889 dtd Jan. 12, 2026.

Non-Final Office Action on U.S. Appl. No. 19/357,902 dtd Dec. 16, 2025.

Non-Final Office Action on U.S. Appl. No. 19/357,918 dtd Jan. 13, 2026.

Non-Final Office Action on U.S. Appl. No. 19/358,919 dtd Dec. 23, 2025.

Non-Final Office Action on U.S. Appl. No. 19/358,959 dtd Dec. 2, 2025.

Non-Final Office Action on U.S. Appl. No. 19/359,002 dtd Jan. 13, 2026.

Non-Final Office Action on U.S. Appl. No. 19/359,036 dtd Jan. 13, 2026.

Non-Final Office Action on U.S. Appl. No. 19/359,438 dtd Dec. 19, 2025.

Non-Final Office Action on U.S. Appl. No. 19/359,531 dtd Dec. 12, 2025.

Non-Final Office Action on U.S. Appl. No. 19/359,534 dtd Dec. 11, 2025.

Non-Final Office Action on U.S. Appl. No. 19/360,020 dtd Jan. 14, 2026.

Non-Final Office Action on U.S. Appl. No. 19/360,328 dtd Dec. 11, 2025.

Non-Final Office Action on U.S. Appl. No. 19/360,405 dtd Jan. 5, 2026.

Non-Final Office Action on U.S. Appl. No. 19/360,512 dtd Dec. 30, 2025.

Non-Final Office Action on U.S. Appl. No. 19/360,809 dtd Jan. 14, 2026.

Non-Final Office Action on U.S. Appl. No. 19/360,880 dtd Dec. 31, 2025.

Non-Final Office Action on U.S. Appl. No. 19/360,886 dtd Dec. 8, 2025.

Non-Final Office Action on U.S. Appl. No. 19/360,892 dtd Jan. 13, 2026.

Schick et al., "Toolformer: Language Models Can Teach Themselves to Use Tools", Feb. 9, 2023, arXiv.com, pp. 1-17 (Year: 2023).

Final Office Action on U.S. Appl. No. 19/357,902 dtd Feb. 9, 2026.

Final Office Action on U.S. Appl. No. 19/358,959 dtd Feb. 5, 2026.

Final Office Action on U.S. Appl. No. 19/360,328 dtd Feb. 26, 2026.

Lee, et al., "Sportify: Question Answering with Embedded Visualizations and Personified Narratives for Sports Video," in arXiv preprint arXiv:2408.05123 (2024). (Year: 2024).

Non-Final Office Action on U.S. Appl. No. 19/357,967 dtd Jan. 28, 2026.

Non-Final Office Action on U.S. Appl. No. 19/358,916 dtd Jan. 28, 2026.

Non-Final Office Action on U.S. Appl. No. 19/360,307 dtd Jan. 20, 2026.

Non-Final Office Action on U.S. Appl. No. 19/360,368 dtd Jan. 28, 2026.

Non-Final Office Action on U.S. Appl. No. 19/360,597 dtd Jan. 30, 2026.

Non-Final Office Action on U.S. Appl. No. 19/360,886 dtd Feb. 19, 2026.

Notice of Allowance on U.S. Appl. No. 19/359,534 dtd Feb. 11, 2026.

Notice of Allowance on U.S. Appl. No. 19/360,873 dtd Jan. 26, 2026.

Structure Guided Prompt: Instructing Large Language Model in Multi-Step Reasoning by Exploring Graph Structure of the Text (Year: 2024).

Final Office Action on U.S. Appl. No. 19/357,856 DTD Apr. 21, 2026.

Final Office Action on U.S. Appl. No. 19/357,889 DTD Apr. 29, 2026.

Final Office Action on U.S. Appl. No. 19/358,919 DTD Apr. 21, 2026.

Final Office Action on U.S. Appl. No. 19/360,512 DTD Apr. 22, 2026.

Final Office Action on U.S. Appl. No. 19/360,597 DTD Jun. 5, 2026.

Final Office Action on U.S. Appl. No. 19/360,809 DTD May 1, 2026.

Final Office Action on U.S. Appl. No. 19/360,880 DTD Apr. 29, 2026.

Final Office Action on U.S. Appl. No. 19/360,892 DTD May 8, 2026.

Mohsenimofidi S, Prasad AS, Zahid A, Ra?q U, Wang X, Attal MI. Classifying user intent for effective prompt engineering: A case of a chatbot for startup teams. InGenerative Al for Effective Software Development Jun. 1, 2024 (pp. 317-329). Cham: Springer Nature Switzeriand. (Year: 2024).

Non-Final Office Action on U.S. Appl. No. 19/357,902 DTD Jul. 15, 2026.

Non-Final Office Action on U.S. Appl. No. 19/359,036 DTD May 11, 2026.

Non-Final Office Action on U.S. Appl. No. 19/359,948 DTD Jun. 17, 2026.

Non-Final Office Action on U.S. Appl. No. 19/360,030 DTD May 7, 2026.

Notice of Allowance on U.S. Appl. No. 19/358,916 DTD May 13, 2026.

Notice of Allowance on U.S. Appl. No. 19/358,959 DTD Jun. 26, 2026.

Notice of Allowance on U.S. Appl. No. 19/360,020 DTD Jun. 16, 2026.

Notice of Allowance on U.S. Appl. No. 19/360,307 DTD May 21, 2026.

Notice of Allowance on U.S. Appl. No. 19/360,405 DTD Apr. 24, 2026.

* cited by examiner

SYSTEMS AND METHODS FOR ROUTING MACHINE-LEARNING PROMPTS IN A DISTRIBUTED NETWORKING ENVIRONMENT

CROSS-REFERENCES TO RELATED APPLICATIONS

This application claims the benefit of and priority to U.S. Provisional Patent Application No. 63/741,297, filed Jan. 2, 2025; and claims the benefit of and priority to U.S. Provisional Patent Application No. 63/708,509, filed Oct. 17, 2024; and claims the benefit of and priority to U.S. Provisional Patent Application No. 63/708,492, filed Oct. 17, 2024; and claims the benefit of and priority to U.S. Provisional Patent Application No. 63/708,528, filed Oct. 17, 2024; and claims the benefit of and priority to U.S. Provisional Patent Application No. 63/708,542, filed Oct. 17, 2024; and claims the benefit of and priority to U.S. Provisional Patent Application No. 63/708,504, filed Oct. 17, 2024; and claims the benefit of and priority to U.S. Provisional Patent Application No. 63/711,415, filed Oct. 24, 2024; and claims the benefit of and priority to U.S. Provisional Patent Application No. 63/708,554, filed Oct. 17, 2024; and claims the benefit of and priority to U.S. Provisional Patent Application No. 63/719,406, filed Nov. 12, 2024; and claims the benefit of and priority to U.S. Provisional Patent Application No. 63/741,671, filed Jan. 3, 2025; the contents of each of which are incorporated herein by reference in their entireties for all purposes.

BACKGROUND

Network environments can support communication between multiple computing devices using techniques such as packet-switching. Data transmitted between devices can be synchronized such that multiple devices on the same network access the same information. However, it can be challenging to efficiently synchronize data transmission for graphical elements using conventional networking technology.

SUMMARY

At least one aspect of the present disclosure is directed to a system. The system can include one or more processors coupled to memory. The one or more processors may maintain an evaluation dataset for a plurality of language models. The evaluation dataset can include a first evaluation example, including: (i) a respective input prompt indicating an intent relating to wager opportunities, and (ii) a respective output message identifying information associated with the intent and a corresponding wager recommendation. The one or more processors may generate a plurality of candidate outputs using a plurality of input prompts and the respective input prompt of the first input example. The one or more processors may determine a plurality of evaluation scores for the plurality of language models based on the respective output message of the first evaluation example and the plurality of candidate outputs. A first score of the plurality of scores can correspond to a first language model of the plurality of language models. The one or more processors may update, based on the first score satisfying an assignment criterion, a data structure to assign the first language model to input prompts identifying the intent.

In some implementations, the one or more processors may receive, from a client device, a prompt corresponding to the intent relating to wager opportunities. In some implementations, the one or more processors may select the first language model of the plurality of language models based on the intent of the prompt. In some implementations, the one or more processors may generate, using the prompt and the first language model, output identifying at least one wager recommendation corresponding to the prompt. In some implementations, the one or more processors may determine the plurality of evaluation scores based on a semantic similarity between the respective output message of the first evaluation example and the plurality of candidate outputs.

In some implementations, the respective input prompt of the first evaluation example can include a plurality of wager recommendations, and the respective output message can include a first wager recommendation of the plurality of wager recommendations. In some implementations, the one or more processors may maintain a plurality of historical wager opportunities. In some implementations, the one or more processors may generate the plurality of wager recommendations based on a search operation of the plurality of wager opportunities using the respective input prompt. In some implementations, the one or more processors may determine a first evaluation score of the plurality of evaluation scores corresponding to the first language model based on a comparison of the first wager recommendation and a corresponding wager recommendation included in a respective candidate output generated by the first language model.

In some implementations, the one or more processors may determine a second plurality of evaluation scores for the plurality of language models using a second evaluation example corresponding to a second intent. In some implementations, the one or more processors may assign a second language model of the plurality of language models to prompts corresponding to the second intent. In some implementations, the intent can identify one or more of a wager type, a live event type, a team identifier, or an athlete identifier.

In some implementations, the one or more processors may generate a plurality of candidate outputs using a combination of the plurality of input prompts and the plurality of historical wager opportunities. In some implementations, the one or more processors may determine the plurality of evaluation scores based on the respective output message of a third evaluation example and the plurality of candidate outputs generated using the combination. In some implementations, the one or more processors may maintain a player profile associated with a client device. In some implementations, the one or more processors may generate the plurality of candidate outputs based on the player profile and the respective input prompt.

At least one aspect of the present disclosure is directed to a method of a system. The method may include maintaining an evaluation dataset for a plurality of language models. The evaluation dataset can include a first evaluation example, including: (i) a respective input prompt indicating an intent relating to wager opportunities, and (ii) a respective output message identifying information associated with the intent and a corresponding wager recommendation. The method may include generating a plurality of candidate outputs using a plurality of input prompts and the respective input prompt of the first input example. The method may include determining a plurality of evaluation scores for the plurality of language models based on the respective output message of the first evaluation example and the plurality of candidate outputs. A first score of the plurality of scores can correspond to a first language model of the plurality of language models. The method may include updating, based on the first score satisfying an assignment criterion, a data structure to assign the first language model to input prompts identifying the intent.

In some implementations, the method may include receiving a prompt corresponding to the intent relating to wager opportunities. In some implementations, the method may include selecting the first language model of the plurality of language models based on the intent of the prompt. In some implementations, the method may include generating, using the prompt and the first language model, output identifying at least one wager recommendation corresponding to the prompt. In some implementations, the method may include determining the plurality of evaluation scores based on a semantic similarity between the respective output message of the first evaluation example and the plurality of candidate outputs.

In some implementations, the respective input prompt of the first evaluation example can include a plurality of wager recommendations, and the respective output message can include a first wager recommendation of the plurality of wager recommendations. In some implementations, the method may include maintaining a plurality of historical wager opportunities. In some implementations, the method may include generating the plurality of wager recommendations based on a search operation of the plurality of wager opportunities using the respective input prompt. In some implementations, the method may include determining a first evaluation score of the plurality of evaluation scores corresponding to the first language model based on a comparison of the first wager recommendation and a corresponding wager recommendation included in a respective candidate output generated by the first language model.

In some implementations, the method may include determining a second plurality of evaluation scores for the plurality of language models using a second evaluation example corresponding to a second intent. In some implementations, the method may include assigning a second language model of the plurality of language models to prompts corresponding to the second intent. In some implementations, the intent can identify one or more of a wager type, a live event type, a team identifier, or an athlete identifier.

In some implementations, the method may include generating a plurality of candidate outputs using a combination of the plurality of input prompts and the plurality of historical wager opportunities. In some implementations, the method may include determining the plurality of evaluation scores based on the respective output message of a third evaluation example and the plurality of candidate outputs generated using the combination. In some implementations, the method may include maintaining a player profile associated with a client device. In some implementations, the method may include generating the plurality of candidate outputs based on the player profile and the respective input prompt.

At least one aspect of the present disclosure is directed to a system. The system can include one or more processors coupled to memory. The one or more processors may receive, from a client device, a prompt for a communication session. The one or more processors may determine, based on the prompt, a classification of an intent corresponding to a first output type of a plurality of output types. The one or more processors may select a first language model of a plurality of language models based on the classification of the intent of the prompt. The first language model can be associated with a first intent type. The first language model can be selected responsive to the classification of the intent matching the first intent type of the first language model. The one or more processors may generate an output message using the first language model and the prompt. The output message can include text data that is responsive to the prompt.

In some implementations, the one or more processors may determine the classification of the intent using a machine-learning model. In some implementations, the machine-learning model can include a second language model of the plurality of language models. The second language model can be different from the first language model. In some implementations, the one or more processors may determine the classification of the intent based on a set of predetermined keywords.

In some implementations, the one or more processors may generate a data structure indicating the first language model is associated with the first intent type based on a plurality of historical prompts and a corresponding plurality of historical output messages generated by the first language model. In some implementations, the one or more processors may maintain a plurality of adapters, each respectively corresponding to the plurality of language models. A first adapter of the plurality of adapters can correspond to the first language model. In some implementations, the one or more processors may apply the first adapter to a base language model to generate the first language model. In some implementations, the first adapter can include a low-rank adaptation data structure or a quantized low-rank adaptation data structure.

In some implementations, a second intent type of a second language model of the plurality of language models can correspond to information requests, and the first intent type of the first language model can correspond to recommendation requests. In some implementations, the one or more processors may receive a second prompt corresponding to a second classification of a second intent. In some implementations, the one or more processors may select a second language model of the plurality of language models based on the second classification of the second intent. The second language model can be associated with a second intent type. The second language model can be selected responsive to the second classification of the second intent matching the second intent type of the second language model. In some implementations, the one or more processors may generate a second output message using the second prompt and the second language model. In some implementations, the one or more processors may provide the output message to the client device for presentation in a graphical user interface in response to the prompt. In some implementations, the one or more processors may provide the second output message to the client device for presentation in the graphical user interface in response to the second prompt.

At least one aspect of the present disclosure is directed to a method of a system. The method may include receiving, from a client device, a prompt for a communication session. The method may include determining, based on the prompt, a classification of an intent corresponding to a first output type of a plurality of output types. The method may include selecting a first language model of a plurality of language models based on the classification of the intent of the prompt. The first language model can be associated with a first intent type. The first language model can be selected responsive to the classification of the intent matching the first intent type of the first language model. The method may include generating an output message using the first language model and the prompt. The output message can include text data that is responsive to the prompt.

In some implementations, the method may include determining the classification of the intent using a machine-learning model. In some implementations, the machine-learning model can include a second language model of the plurality of language models. The second language model can be different from the first language model. In some implementations, the method may include determining the classification of the intent based on a set of predetermined keywords.

In some implementations, the method may include generating a data structure indicating the first language model is associated with the first intent type based on a plurality of historical prompts and a corresponding plurality of historical output messages generated by the first language model. In some implementations, the method may include maintaining a plurality of adapters, each respectively corresponding to the plurality of language models. A first adapter of the plurality of adapters can correspond to the first language model. In some implementations, the method may include applying the first adapter to a base language model to generate the first language model. In some implementations, the first adapter can include a low-rank adaptation data structure or a quantized low-rank adaptation data structure.

In some implementations, a second intent type of a second language model of the plurality of language models can correspond to information requests, and the first intent type of the first language model can correspond to recommendation requests. In some implementations, the method may include receiving a second prompt corresponding to a second classification of a second intent. In some implementations, the method may include selecting a second language model of the plurality of language models based on the second classification of the second intent. The second language model can be associated with a second intent type. The second language model can be selected responsive to the second classification of the second intent matching the second intent type of the second language model. In some implementations, the method may include generating a second output message using the second prompt and the second language model. In some implementations, the method may include providing the output message to the client device for presentation in a graphical user interface in response to the prompt. In some implementations, the method may include providing the second output message to the client device for presentation in the graphical user interface in response to the second prompt.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form. For example, by appropriate computer programs, which may be carried on appropriate carrier media (e.g., computer readable media), which may be tangible carrier media (e.g., disks) or intangible carrier media (e.g., communications signals). Aspects may also be implemented using suitable apparatuses, which may take the form of programmable computers running computer programs arranged to implement the aspect. As used in the specification and in the claims, the singular form of "a", "an", and "the" include plural referents unless the context clearly dictates otherwise.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1:
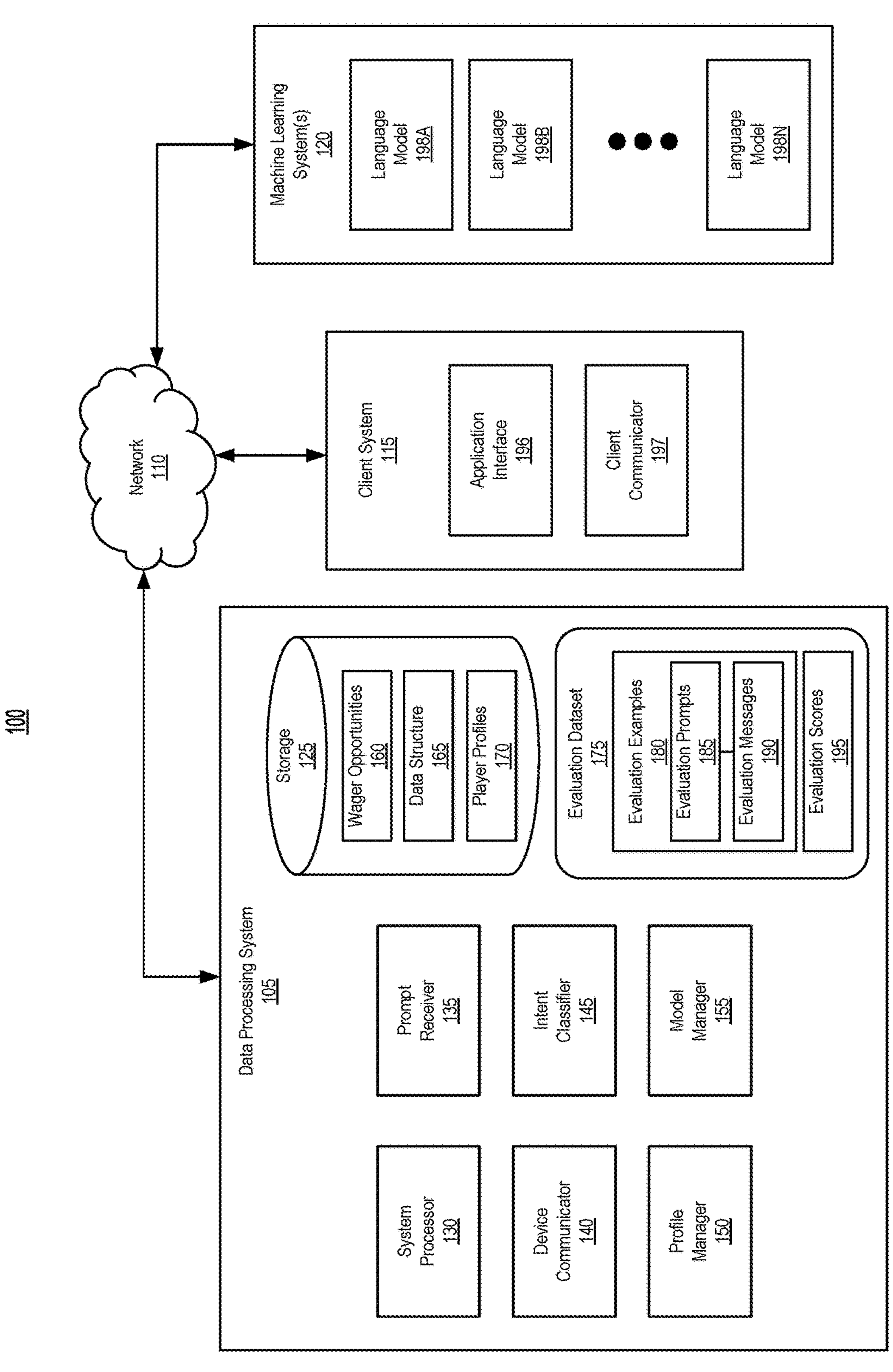
FIG. 1 illustrates a block diagram of an example system for monitoring and evaluating language performance according to real-time data in a distributed networking environment, in accordance with one or more implementations.

Below are detailed descriptions of various concepts related to, and implementations of, techniques, approaches, methods, apparatuses, and systems for providing interactive game experiences. The various concepts introduced above and discussed in greater detail below may be implemented in any of numerous ways, as the described concepts are not limited to any particular manner of implementation. Examples of specific implementations and applications are provided primarily for illustrative purposes.

Natural language processing techniques can be applied across a wide range of computing environments to generate responses or other outputs based on natural language prompts. Language models and other machine-learning models can be used in various applications, including but not limited real-time information retrieval interfaces, which can be limited according to processing capacity of the systems executing such machine-learning models. To perform such operations, a language model can process input data sequences that represent prompts, contextual information, and other relevant data.

As language models typically include a large number of parameters, invoking such language models typically requires significant processing resources that make language models challenging to use for certain applications (e.g., real-time or near real-time applications. The number of operations and the amount of memory used to process a prompt is generally influenced by the size of the input context provided to the language model. Input contexts can include historical exchanges, metadata, and/or external reference information that may be relevant to generating an accurate or contextually suitable output. Generating suitable outputs typically involves providing large amounts of information as input to language models, which can significantly hinder performance, both in terms of accuracy and execution performance (e.g., computing resource utilization).

Conventional techniques for supplying input contexts to language models fail to ameliorate these issues. For example, conventional approaches often require sending large contexts, which often include an entire accumulated input, across multiple requests to achieve a requested output. Increasing the size of the input context results in increased network latency and bandwidth consumption. During output generation, executing language models with large input contexts causes processor load and increased memory allocation that grow at rates that reduce the feasibility of using language model in many real-time or near real-time applications. As a result, existing systems experience limited throughput, excessive memory consumption, and elevated network resource usage.

The techniques described herein address these and other issues by generating targeted input contexts for a language model that include only data determined to be relevant to a given prompt. In general, the techniques can select prompt-specific subsets of available context data based on one or more classification processes and/or rule-based policies. By constructing an input context from only the selected subset, the techniques described herein can significantly reduce the processing resources needed to process the input context without omitting information that is pertinent to generating an accurate output. Such context selection operations can be perform in connection with session-based data persistence, such that follow-on prompts can be processed according to previously stored interaction data, in some implementations.

By selectively reducing the contents of an input context based on prompt relevance and by avoiding redundant transmission of static context data, the techniques described herein can lower processing time and memory requirements for language model execution. Network bandwidth consumption can also be reduced because only incremental or newly relevant data is transmitted for follow-on prompts, rather than the entire accumulated context. These improvements can provide faster response times for multi-turn interactions, sustain throughput in high-load scenarios, and enable the use of large-scale language models within low-latency applications where conventional approaches would exceed performance constraints.

In further detail, various implementations of the systems and methods described herein can be used to reduce processor utilization and memory consumption when processing prompts with additional contextual input via one or more language models or other machine-learning models. For example, a system can maintain one or more data structures storing specific information that can be automatically selected for inclusion in an input context of the language/machine-learning models. As noted above, the computing resources (e.g., computing time and/or memory/caching consumption) used to execute language models or other natural language processing functions on computers increase at least quadratically with the size of the input context (e.g., the input data to be processed). Executing language models using existing techniques therefore restricts the context size according to the expected/target processing time of a corresponding request. For real-time or near real-time applications, such extended delays make using language models impossible to use.

To address these challenges, the systems and methods described herein can dynamically generate an input context that includes a subset of data that can be used to carry out requested computing operations. Such automatic selection may be performed, for example, according to intent classification operations executed using additional machine-learning models and/or specific rules-based selection policies. By automatically selecting certain data to be included in the input context, the systems and methods described herein automatically limit the input context for the language model to a targeted subset of available data, thereby reducing the latency (e.g., processing time) and memory allocation required to carry out the requested operations using the language model. As a result, the systems and methods described herein operate more efficiently, and allow for the use of language models in real-time or near real-time processing applications, which would otherwise be impossible to implement using existing techniques.

In various implementations, using the input contexts generated/constructed according to specified in intents, the systems and methods described can monitor, evaluate, and select different language models for different tasks to improve overall performance and accuracy. Conventional systems that implement language models do not implement techniques for evaluating the performance of language models for different tasks or instructions, and therefore rely on sub-optimal, inefficient, and resource-constrained language models to perform different machine-learning tasks. The techniques described herein can implement intent classification and input context generation to classify which language models are best suited to process a corresponding prompt without exhausting network or computing resources.

In some implementations, the technical solutions described herein can address the challenge of hallucinations in LLM outputs, where the model generates responses that are plausible but incorrect. For example, by generating improved input contexts with particular data from up-to-date data sources using structured input, the systems and methods described herein can reduce the likelihood of hallucinatory responses from the LLM. Some implementations described herein can dynamically select LLMs, or adapters thereof, depending on a provided prompt. Dynamic selection can be performed to reduce instances of hallucinations, incorrect output, and can improve computational performance of executing LLMs.

The techniques described herein include features and functionalities relating to improved machine learning for processing prompt data. For purposes of reading the descriptions of the various implementations below, the following descriptions of the sections of the Specification and their respective contents may be helpful:

I. Section A describes a remote or local computing environment that may be useful for providing machine-learning system functionalities.

II. Section B describes systems and methods for monitoring and evaluating language performance according to real-time data in a distributed networking environment.

III. Section C describes systems and methods for routing machine-learning prompts in a distributed networking environment.

IV. Section D describes a computing and networking environment that may be useful for practicing the implementations described herein.

A. Remote or Local Computing Environment for Providing Machine-Learning System Functionalities Referring to FIG. 1, depicted is a block diagram of an example system 100 for monitoring and evaluating language performance according to real-time data in a distributed networking environment. In FIG. 1, the system 100 can include at least one data processing system 105, at least one network 110, at least one client system 115 (sometimes referred to herein as a "client device 115"), and one or more machine learning systems 120. The data processing system

105 can include at least one storage 125, at least one system processor 130, at least one prompt receiver 135, at least one device communicator 140, at least one intent classifier 145, at least one profile manager 150, at least one model manager 155, and at least one evaluation dataset 175. The storage 125 can include one or more wager opportunities 160, one or more data structures 165, and one or more player profiles 170. The evaluation dataset 175 can include one or more evaluation examples 180 and one or more evaluation scores 195. The evaluation examples 180 can include one or more evaluation prompts 185 and one or more evaluation messages 190. The client system 115 can include at least one application interface 196 and at least one client communicator 197. The machine learning systems 120 can include one or more language models 198A-198N (which may sometimes be generally referred to as the "language model(s) 198").

The data processing system 105 can include a cloud system, a server, a distributed remote system, or any combination thereof. The data processing system 105 can include a virtual computing system, an operating system, and a communication bus to effect communication and processing. The data processing system 105 can include physical infrastructure, such as physical servers, storage devices, and network equipment housed in data centers. The data processing system 105 can include a virtual computing system, which can include cloud-based virtual machines or containers for running applications and services. The data processing system 105 can include an operating system that can function as the core manager, allocating resources, configuring processes, and maintaining seamless interaction between hardware and applications. The data processing system 105 can include a communication bus that can facilitate communication between different components within the system. The data processing system 105 can connect with external systems to allow for data exchange and service delivery to end users.

The client system 115 (e.g., associated with a client device) can include a computing system that can be used to access the functionality of the data processing system 105. The system 100 can include any number of client systems 115, each of which may be associated with a respective player profile 170. The client system 115 can include a smart phone, mobile device, laptop computer, desktop computer, one or more servers, or any other type of computing device. The client system 115 can include at least one processor and a memory, e.g., a processing circuit. The memory can store processor-executable instructions that, when executed by the processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language.

The client system 115 can include one or more devices to receive input from a user and/or to provide output to a user. For example, the output capabilities of the application interface 196 can be presented by a display device that provides visual feedback to the user. The display device can enhance the user experience with electronic displays, such as liquid crystal displays (LCD), light-emitting diode (LED) displays, or organic light-emitting diode (OLED) displays. The electronic displays can implement interactive features, including capacitive or resistive touch input, allowing for multi-touch functionality. The input functionalities can include a keyboard, mouse, or an integrated touch-sensitive panel on the display device, but are not limited thereto.

The machine learning system 120 can include one or more machine learning models trained on datasets. The machine learning system 120 can include a cloud system, a server, a distributed remote system, or any combination thereof. The machine learning system 120 can include, but is not limited to, at least, a central processing unit (CPU), a graphics processing unit (GPU), a tensor processing unit (TPU), or the like. The machine learning system 120 can include a memory operable to store one or more instructions for operating components of the machine learning system 120 and operating components operably coupled to the machine learning system 120. For example, the instructions can include firmware, software, hardware, operating systems, or embedded operating systems, among others. The machine learning system 120 can be internal to the data processing system 105. The machine learning system 120 can exist external to the data processing system 105 and can be accessed via the network 110. In some implementations, the machine learning system 120 implements or otherwise provides access to one or more application programming interfaces (APIs), via which the data processing system 105 and/or the client system 115 can access the language model 198 or other functionality of the machine learning system 120.

The system 100 is shown as including one or more machine learning systems 120, each of which may store, maintain, and execute one or more language model(s) 198A-198N. In some implementations, each machine learning system 120 can store, maintain, and execute a respective language model 198. In some implementations, a machine learning system 120 can store, maintain, and execute multiple different language model(s) 198, which may be accessed using one or more API calls or other communication interfaces. In some implementations, one or more language models 198 may be stored, maintained, or otherwise executed by the data processing system 105, while other machine-learning models 198 may be stored, maintained, or otherwise executed by one or more machine learning systems 120.

The network 110 can include computer networks such as the Internet, local, wide, metro, or other area networks, intranets, satellite networks, other computer networks such as voice or data mobile phone communication networks, and combinations thereof. The data processing system 105 of the system 100 can establish a communication session via the network 110, for example, with the client systems 115 and/or the machine learning system 120. Establishing a communication session can refer to creating a temporary connection between two or more devices to exchange information. For example, this can include setting up a data exchange session between the client system 115 and the data processing system 105. The network 110 may be any form of computer network that can relay information between the data processing system 105, the client system 115, the machine learning system 120, and one or more information sources, such as web servers or external databases, amongst others.

The network 110 can include the Internet and/or other types of data networks, such as a local area network (LAN), a wide area network (WAN), a cellular network, a satellite network, or other types of data networks. The network 110 can include any number of computing devices (e.g., computers, servers, routers, network switches, etc.) that are configured to receive and/or transmit data within the network 110. The network 110 can further include any number of hardwired and/or wireless connections. Any or all of the computing devices described herein (e.g., the data processing system 105, the client system 115, the machine learning system 120, etc.) can communicate wirelessly (e.g., via Wi-Fi, cellular, radio, etc.) with a transceiver that is hardwired (e.g., via a fiber optic cable, a CAT5 cable, etc.) to other computing devices in the network 110. Any or all of the computing devices described herein can communicate wirelessly with the computing devices of the network 110 via a proxy device (e.g., a router, network switch, or gateway).

The data processing system 105 can include the storage 125. The storage 125 can be a computer-readable memory that can store or maintain any of the information described herein. The storage 125 can store data associated with the system 100. The storage 125 can include one or more hardware memory devices to store binary data, digital data, or the like. The storage 125 can include one or more electrical components, electronic components, programmable electronic components, reprogrammable electronic components, integrated circuits, semiconductor devices, flip flops, arithmetic units, or the like. The storage 125 can include at least one of a non-volatile memory device, a solid-state memory device, a flash memory device, or a NAND memory device. The storage 125 can include one or more addressable memory regions disposed on one or more physical memory arrays. A physical memory array can include a NAND gate array disposed on, for example, at least one of a particular semiconductor device, an integrated circuit device, or a printed circuit board device. In an aspect, the storage 125 can correspond to a non-transitory computer readable medium. In an aspect, the non-transitory computer readable medium can include one or more instructions executable by the system processor 130.

In some implementations, the storage 125 can store, modify, or otherwise maintain any of the information described herein using one or more databases. The storage 125 can be accessed using one or more memory addresses, index values, or identifiers of any item, structure, or region maintained in the storage 125. The storage 125 can be accessed by the components of the data processing system 105, the client system 115, the machine learning system 120, or any other computing device described herein, via the network 110. The storage 125 can be internal to the data processing system 105. The storage 125 can exist externally to the data processing system 105 and can be accessed via the network 110. For example, the storage 125 can be distributed across many different computer systems (e.g., a cloud computing system) or storage elements and may be accessed via the network 110 or a suitable computer bus interface.

The data processing system 105, the client system 115, or the machine learning system 120 can store in the storage 125 the results of any or all computations, determinations, selections, identifications, generations, constructions, or calculations in one or more data structures indexed or identified with appropriate values. Any or all values stored in the storage 125 can be accessed by any computing device described herein, such as the data processing system 105, the client system 115, or the machine learning system 120, to perform any of the functionalities or functions described herein. In implementations where the storage 125 forms a part of a cloud computing system, the storage 125 can be a distributed storage medium in a cloud computing system and can be accessed by any of the components of the data processing system 105, the client system 115, the machine learning system 120, or by any other computing devices described herein.

The storage 125 can store wager opportunities 160. The wager opportunities 160 can include event information, identifying the specific live event each wager is tied to, such as team names, game details, etc. The wager opportunities 160 can include wager options, including different types of bets available for each event, such as moneyline, point spread, parlay, or over/under, among other markets. The wager opportunities 160 can include odds, for example, the payout ratio associated with each wager and how much a winning wager would return. The wager opportunities 160 can include an indication of a live event. The live event can function as an identifier or reference, pointing to a specific ongoing live event from the available selections. The wager opportunities 160 can include an indication of a parlay or a single bet recommendation. For example, the wager opportunities 160 can include flags or markers indicating whether a wager is a parlay, a single (e.g., moneyline) wager, or any other type of wager. The wager opportunities 160 can include a record of the number of wagers placed for each wager opportunity 160.

In some embodiments, the wager opportunities 160 can include data corresponding to historical wager opportunities. The historical wager opportunities can correspond to past wagering opportunities. For example, the historical wager opportunities can include details about the wagers placed on past games, such as the types of wagers, the odds offered, the outcomes of those wagers, and the volume of wagers made on specific events or outcomes. The wager opportunities 160 can be used to calculate or adjust the odds associated with the current wager opportunities. In some embodiments, the odds associated with wager opportunities 160 can be dynamically adjusted based on various factors, such as live event data/developments, fluctuations in betting volume, and historical wager patterns, among others. Upon detecting significant events, such as scores, timeouts, updates to bet slips, wagers added or removed, or legs added or removed, the data processing system 105 can recalculate and adjust wager odds. In some implementations, the data processing system 105 can track the popularity of specific wager types or specific wager opportunities, such as single game parlays, quick single game parlays (Quick SGPs), by tracking the number of times the corresponding wager types/opportunities have been selected. For example, each wager opportunity 160 can include or be associated with a counter that is incremented each time the wager opportunity is selected by a player via the data processing system 105. In some implementations, based on prompts and betting trends, the data processing system 105 can categorize or flag wager opportunities 160 as components or legs of parlay wagers.

The storage 125 can store a data structure 165 used to track and maintain mappings between specific language models 198 and various types of input prompts submitted by a player profile 170. The data structure 165 can store information regarding the association of one or more language models 198 with input prompts, including, but not limited to, the prompt categories (e.g., specific types of queries, such as event information requests, odds inquiries, wager updates, or personalized recommendations), the corresponding language model 198 (e.g., which language model is best suited for addressing a particular prompt category), and the type of response generated (e.g., whether the response is a simple text-based reply, a real-time odds calculation, or a more complex data-driven recommendation).

In some implementations, the data structure 165 can indicate which language model 198 is associated with which intent type, for example, based on historical prompts and corresponding historical output messages generated by language models 198. The data structure 165 can maintain a dataset of historical prompts and output messages generated by various language models 198. In some embodiments, the data structure 165 can associate language models 198 with input prompts that indicate different user intents. For example, the data structure 165 can associate language models 198 with input prompts that can indicate a particular intent, such that those language models 198 are selected upon detecting a prompt that is classified as having its corresponding intent. The intent of a prompt can be determined based on various techniques, as described herein further detail herein. For example, one element of a prompt that may correspond to an intent can include an indication of a wager type identified from the prompt, which can include the type of wager (e.g., straight bet, parlay, teaser). Another element can be a live event type, referring to the specific sporting event (e.g., football, basketball, tennis). The intent can be associated with a team identifier, indicating the team involved in the wager. Additionally, an athlete identifier can indicate a specific athlete/participant identified in the prompt. The association between prompt intents and language models 198 can vary, such as one-to-one, one-to-many, or many-to-one, depending on the complexity of the input prompt and the language model's capabilities. The data processing system 105 can update the data structure as language models 198 are Each prompt can be associated with a reference identifier (e.g., an identifier for tracking the specific input prompt and its corresponding language model 198). In some implementations, the data structure 165 can store status information for each of the language models 198 (e.g., whether a language model is currently active, inactive, or undergoing updates). In some implementations, the data structure 165 can store timestamps (e.g., the time the prompt was submitted or processed) and the intent type (e.g., event-related inquiry, wager or odds adjustment, personalized recommendation) to which the language model 198 is mapped. The data structure 165 may further store any other information relating to language model(s) 198 described herein, including communication information (e.g., API endpoint information, etc.), input context format information, capability information (e.g., text-only, multi-modal, general purpose, etc.), cost information, or attributes (e.g., number of model parameters, type of language model, input format, etc.).

In some implementations, the data structures 165 can store containers (e.g., arrays, lists, dictionaries), indices, or otherwise store each of the values, sets, variables, or vectors associated with default input context data (e.g., input context formats, tokenizer models, etc.) and their corresponding language model mappings. In some implementations, the data structure 165 can store indications of historical prompts and the corresponding language models 198 to which the historical prompts were provided. In some implementations, the data structures 165 can store various types of data, including textual data (e.g., prompt description, player input, language model response), numeric data (e.g., response time, accuracy score, prompt frequency), structured data (e.g., prompt type, response type, language model status), and other data types (e.g., custom fields for specific language model configurations), or other metadata, among others.

The storage 125 can store one or more player profiles 170 associated with a user (sometimes referred to herein as a "player") of a client system 115. A player profile 170 of a player can be a user profile that includes information about the player and information about one or more of the client systems 115 used to access the data processing system 105 using the player profile 170. For example, identifiers of the player profile 170 can be used to access the functionality of the data processing system 105 (e.g., by logging into the data processing system 105 via one or more web-based interfaces). The identifiers can include a username, a password, an e-mail address, a phone number, a personal identification number (PIN), a secret code-word, and device identifiers for use in a two-factor authentication technique, among others. The player profile 170 can store information about wagers, games, and live events that are performed by the player via the data processing system 105.

The player profile 170 can store a credit balance, wager information or side wager information (e.g., an amount of a wager/side wager, a timestamp associated with a wager/side wager, information about gaming conditions or game state information that resulted in a side wager, a client system identifier of the client system 115 that was used to place the wager/side wager, etc.). The player profile 170 can store information about the client system 115 used to access the data processing system 105, such as an IP address, a MAC address, a GUID, a player profile name (e.g., the name of a user of the client system, etc.), and device name, among others. In some implementations, the player profile 170 can be generated by the data processing system 105 in response to the player profile generation request transmitted by the client system 115 associated with a client device. The player profile generation request can include any of the player profile information described herein.

The data processing system 105 can include an evaluation dataset 175. The evaluation dataset 175 can be stored in a computer-readable memory that can store or maintain any of the information described herein. The evaluation dataset 175 can include evaluation examples 180 for machine learning system 120 and/or language model 198 performance for a variety of intents, tasks, or operations. In some implementations, the evaluation dataset 175 can correspond to an organized collection of data that can be stored and accessed electronically. The evaluation dataset 175 can store data in a structured format, for example, using tables, rows, and columns. In some implementations, the evaluation dataset 175 can be updated by the data processing system 105, operator computing systems in communication with the data processing system 105, or any other authorized computing system described herein.

The evaluation dataset 175 can include evaluation examples 180. The evaluation examples 180 can refer to individual sets of input data and output data that is used to evaluate the performance of the language models 198A-N for any number of tasks or operations. In some implementations, the evaluation dataset 175 can store respective sets of evaluation examples 180 for different types of tasks, operations, prompt intents, evaluation scores, or combinations thereof. For example, different sets of valuation examples 180 can be used to determine different types of performance metrics (e.g., evaluation scores 195) such as exact match (EM) scores, F1 score, accuracy scores, precision scores, and/or recall scores, among others.

In some implementations, the evaluation dataset 175 and/or the evaluation examples 180 can provide an evaluation framework for the language model 198. For example, the evaluation examples 180 can include various metrics for determining the performance of the language model 198, such as factual consistency, answer relevancy, conceptual similarity, toxicity, and bias. The evaluation dataset 175 can be used to simplify the process of evaluating the outputs generated by the language model 198 and support the development of custom metrics directed to specific requirements. For example, the evaluation dataset 175 or the evaluation examples 180 can be used by the language model 155 to determine evaluation scores 195 for each language model 198 and each combination of intents, tasks/operations, or other model outputs.

The evaluation examples 180 can include evaluation prompts 185, which can include input contexts for one or more language models 198 (or data for which to generate input contexts) reflecting different requests, intents, or other operations. Each evaluation example 180 can include one or more corresponding evaluation messages 190, which can reflect an expected output when the corresponding evaluation prompt 185 is processed language models 198. The evaluation prompts 185, also sometimes referred to herein as evaluation prompts or evaluation requests, can include any data that may be provided as input to the language models 198 to generate output corresponding to different intents, operations, or any other metric that may be measured or used by the data processing system 105. In some implementations, different evaluation datasets 175 can correspond to different types of intents (e.g., different categories of intents that may be processed by the data processing system 105). For example, different evaluation prompts 185 can indicate different intents such as requests for wager recommendations, requests for odds information, requests for searches, deep links, or application interfaces, general conversational inputs relating to different contexts/applications, or any other domain-specific intent, task, or operation. In some implementations, the evaluation prompts 185 can be categorized based on factors, such as the type of intent or intent category, which may include intent categories for different types of wagers (e.g., straight bet, parlay, teaser), live event types (e.g., football, basketball, tennis, playoffs, etc.), team identifiers, or athlete identifier, among other data. The evaluation prompts 185 can be structured to maintain clarity and precision.

In some implementations, the complexity of the evaluation prompts 185 can vary, ranging from basic input prompts (e.g., "What's the moneyline for the Blue Knights game?") to complex multi-variable situations, including multiple wager conditions (e.g., "Provide a parlay bet involving the Red Hawks winning and Alex Smith scoring more than 20 points"), or larger input contexts simulating entire conversations with multiple prompts and response messages. In some implementations, the evaluation prompts 185 can include requests for one or more wager opportunities. For example, the evaluation prompts 185 can include input prompts such as, "What are the odds on the Red Hawks winning the championship?" or "Recommend a parlay bet for tonight's Premier League matches." Other examples can include, "Provide a teaser bet involving the Thunderbolts and the Steel Titans," or "What are the odds for the game between Ryan Parker and Jake Turner?", among others. Such evaluation prompts 185 may include corresponding wager recommendation data corresponding to the requests, simulating automatic retrieval of wager opportunities from the storage 125 for inclusion in an input context for the language model(s) 198.

The evaluation messages 190 can be ground truth messages against which the output of language models 198 are evaluated. The evaluation messages 190 can include natural language output that corresponds to the intent of the respective evaluation prompt 185. For example, an evaluation message 190 can include a corresponding wager recommendation. In some implementations, the evaluation messages 190 can include a specific wager recommendation. The evaluation messages 190 can indicate the expected or desired outputs from the language model 198 in response to the evaluation prompts 185. In some implementations, the evaluation messages 190 can include any relevant, accurate information aligned with the intent of the corresponding evaluation prompt 185.

In some implementations, where corresponding evaluation prompt 185 includes a request for a wager recommendation, the evaluation message 190 can include a specific wager recommendation. For example, the evaluation messages 190 can include one or more data structures indicating information that simulates a response including a wager opportunity 160, including information such as wager identifier, odds information, identifiers of corresponding teams, participants, or live events, counters/tracking information for numbers of wagers placed, or any other information associated with a wager opportunity 160. Furthering this example, such evaluation messages 190 may include natural language output corresponding to the wager recommendation, such as "The odds on the Red Hawks winning the championship are +250", or "A possible parlay bet could involve the Blue Knights to win their game and the Thunderbolts to lose theirs". Similar evaluation messages 190 can include information relating to any other type of intent reflected in corresponding evaluation prompts 185, including but not limited to information relating to information resources, deep links, player profile 170 information, or any other intent or type of prompt.

The evaluation dataset 175 can include evaluation scores 195. The evaluation scores 195 can include numerical value(s) that quantify the performance of each language model 198A-N in processing different evaluation prompts 185 and generating accurate output (which may include wager recommendations, etc.). The evaluation score 195 can be used to determine how well the language model 198 performs in producing output that conforms to corresponding evaluation messages 190, which may include simulations of recommended wagers, or providing, summarizing, or characterizing information in the input context of the corresponding evaluation prompt(s) 185. In some implementations, the evaluation score 195 can provide a summary of the language model's performance in processing different types of evaluation prompts 185, for example, providing comparison between different language models 198A-198N, or different configurations or versions of the same language model 198. The evaluation score 195 can be used to determine which language models 198 are best suited for different intents, tasks, or output, and may include various different types of scores or metrics that may be used to determine which language models 198 are best suited for different processing tasks.

In some implementations, the evaluation scores 195 can include evaluation scores such as exact match scores, precision scores, F1 scores, recall scores, Recall-Oriented Understudy for Gisting Evaluation (ROUGE) scores, among other evaluation metrics. Exact match scores can be used to measure the percentage of queries that the language model 198 answers correctly by precisely matching (or matching within a predetermined threshold value) a corresponding expected answer (e.g., a corresponding evaluation message 190). The precision score can indicate the percentage of correct predictions relative to all predictions made by the language model 198. The precision score can be proportional to a number correctly predicted tokens in for output given an input evaluation prompt 185 that correspond to tokens in the corresponding evaluation message 190.

In some implementations, a high precision score for an evaluation prompt 185 having a corresponding intent indicates that the output generated by the corresponding language model 198 is mostly accurate, with few false predictions. In another example, a recall score can quantify the percentage of relevant answers captured by the language model 198, the language model 155, or the data processing system 105 executing a language model, depending on the implementation. The recall score can be proportional to the number of correct positive predictions (e.g., relative to an evaluation message 195) that a language model predicts 195. A high recall score can indicate that a language model 198 generates output that includes relevant tokens and/or tokens in the corresponding evaluation message 190 given an input evaluation prompt 185. An F1 score can be calculated as the harmonic mean of the precision score and the recall score.

In some implementations, the evaluation scores 195 can be calculated for each set of evaluation examples 180. For example, different sets of evaluation examples 180 may be provided for different intents, prompt types, or other types of input that may be provided to one or more language models 198. In some implementations, the language models 198 can be evaluated against each set of evaluation examples 180, to generate a corresponding set of evaluation scores 195 for each language model 198. The evaluation scores 195 can then be used to rank or otherwise select the language model 198 having the best performance for a particular task/intent type/category.

In some implementations, the evaluation metrics 195 can include metrics such as ROUGE scores that can be used to indicate the quality of output generated by the language models 198. The ROUGE can be used to evaluate the relevance and accuracy of text output by measuring the overlap between the output generated by language models 198 given evaluation prompt(s) 185 as input and corresponding outputs specified in corresponding evaluation messages 190. For example, the ROUGE can consider n-grams (sequences of words) to identify common phrases or keywords, and a higher ROUGE score can indicate greater similarity between the generated and reference recommendations, suggesting that the language model 198 effectively captures relevant information in the input prompt and generates suitable output.

In some implementations, the evaluation metrics 195 can include metrics from using a retrieval augmented generation (RAG) framework, sch as the Retrieval Augmented Generation Assessment (RAGAS) framework, which can provide a set of evaluation metrics 195 for evaluating the language model's performance. For example, the model manager 155 can evaluate the performance of the retrieval and generation components of the language model by focusing on key metrics such as context precision, context recall, faithfulness, and answer relevancy, among others. The context precision can be used to measure how accurately the language model 198 performs in generating output given particular retrieved data, such as historical wager opportunities related to the corresponding evaluation messages 190, and context recall can measure the ability of the language model 198 to recall relevant information.

In some implementations, the evaluation scores 195 can indicate mean squared error (MSE), which measures the average squared difference between predicted odds or wagering outcomes and the actual results. The evaluation scores 195 can be calculated using input data (e.g., evaluation prompts 185) from the evaluation dataset 175 and/or the storage 125 that can include historical wager data, wager outcomes, and event information, among others. The language model 198 can generate predictions or recommendations based on the input data, and the predictions can be compared to the actual outcomes (e.g., evaluation messages 190) to calculate the evaluation score 195. In some implementations, the individual comparisons can be aggregated into a single numerical score to determine the overall performance of the language model 198.

The data processing system 105 can include the system processor 130. The system processor 130 can execute one or more instructions associated with the data processing system 105. The system processor 130 can include an electronic processor, an integrated circuit, or the like, including one or more of digital logic, analog logic, digital sensors, analog sensors, communication buses, volatile memory, nonvolatile memory, and the like. The system processor 130 can include, but is not limited to, at least one central processing unit (CPU), graphics processing unit (GPU), physics processing unit (PPU), tensor processing unit (TPU), embedded controller (EC), or the like. The system processor 130 can include a memory operable to store or storing one or more instructions for operating components of the system processor 130 and operating components operably coupled to the system processor 130. For example, the one or more instructions can include one or more of firmware, software, hardware, operating systems, or embedded operating systems. The system processor 130 or the data processing system 105 can include one or more communication bus controllers to effect communication between the system processor 130 and the other elements of the data processing system 105.

The data processing system 105 can include the prompt receiver 135. The prompt receiver 135 can be or include any script, file, program, application, set of instructions, or computer-executable code that is configured to process input data in the form of a prompt. The prompt receiver 135 can include hardware, software, or any combination thereof. A prompt can include any user-provided command, request, or text data. The prompt can include a request or information relating to bet placement, such as an indication of a wager type, a wager amount, or selecting specific live events or outcomes. The prompt receiver 135 can receive the prompt from the client system 115 in natural language (e.g., a text string). The prompt receiver 135 can receive prompts through user interactions with the application interface 196. User interactions can include clicking buttons, entering text, or using voice commands within one or more application interfaces 196, among others. In some implementations, the prompt receiver 135 can expose an API endpoint, allowing other applications or systems to send prompts in structured formats such as JSON or XML. In some implementations, the prompt receiver 135 can subscribe to a message queue where prompts are published by other components/devices of the system 100, for example, according to a publisher-subscriber communication protocol. In some implementations, the prompt receiver 135 can identify specific events or triggers, such as user actions or system state changes, which can generate prompts. In some implementations, the prompt receiver 135 can process prompts loaded from files stored on the data processing system 105.

In some implementations, the prompt receiver 135 can parse and process the prompts to extract information, such as wager type, amount, and game selections, among others. The prompt receiver 135 can execute functions based on the prompt's content. In some implementations, the prompt receiver 135 can perform validation checks. For example, the prompt receiver 135 can validate the requested wager against current betting odds or predefined rules. The prompt receiver 135 can validate the sufficiency of the user's account balance via the profile manager 170. The prompt receiver 135 can validate the timing of the bet. The prompt receiver 135 can facilitate the transmission of the wager to the service provider's backend, where the wager is logged and acted upon. The prompt receiver 135 can format the wager information or the user's input into a standardized data structure for transmission to the backend for further processing, such as logging, risk assessment, odds calculation, and wager recommendation, among others. The prompt receiver 135 can collect or store records of user prompts (and, in some implementations, conversation records including corresponding responses) in the storage 125 as part of one or more evaluation datasets 175 to improve the identification accuracy of the language model 198 over time, in some implementations.

The data processing system 105 can include the device communicator 140. The device communicator 140 can be or include any script, file, program, application, set of instructions, or computer-executable code that is configured to facilitate communication between the data processing system 105, the client system 115, and the machine learning system 120. The device communicator 140 can include hardware, software, or any combination. The device communicator 140 can facilitate communication between the data processing system 105, the network 110, the client system 115, and/or the machine learning system 120 via one or more communication interfaces. A communication interface can include, for example, an API compatible with components of the data processing system 105, the client system 115, or the machine learning system 120.

The device communicator 140 can support various communication protocols (TCP/IP, UDP) compatible with a particular component of the data processing system 105, a particular component of the client system 115, or a particular component of the machine learning system 120. The device communicator 140 can implement multiple communication interfaces, including web sockets or messaging protocols, to accommodate a range of client applications. The device communicator 140 can facilitate data transfer through techniques such as compression, encryption, and error correction, among others. The device communicator 140 can be compatible with diverse content items and can be compatible with particular content delivery systems corresponding to particular content items, structures of data, types of data, or any combination thereof. For example, the device communicator 140 can be compatible with the transmission of text data or binary data structured according to one or more metrics or data of the application interface 196 or the client system 115. The device communicator 140 can provide the client system 115 with instructions to display lists of interactive options, such as live events, content items, or wagering opportunities.

The data processing system 105 can include the intent classifier 145. The intent classifier 145 can be or include any script, file, program, application, set of instructions, or computer-executable code that is configured to determine the classification of the request included in a user input, referred to as a prompt, an input prompt, an input, or a request. The intent classifier can include hardware, software, or any combination. The intent classifier 145 can parse prompts received from the client system 115 to determine the intent of the user. In some implementations, the intent classifier 145 can classify the intent corresponding to predefined output types. The output types can include providing odds information, suggesting wager recommendations, explaining rules and regulations of sports or wager types, or providing general information such as facts or statistics about teams, players, or events. In some implementations, the intent of the user can correspond to wagering-related intents. For a given prompt, the data processing system 105 can use the intent classifier 145 to generate an input context for the language model 198 using the prompt and its classification. The input context can include a variety of information, such as prompts, questions, or previous parts of a conversation. The intent classifier 145 can identify the desired action or information sought by the user.

In some implementations, the intent classifier 145 can use rule-based techniques to identify prompts that indicate a wagering-related intent. For instance, a rule can specify that when a prompt is related to betting, the intent classifier 145 can categorize the intent as wagering related. For example, a prompt like "What are the odds for the Thunderbolts to win tonight?" can cause the intent classifier 145 to determine a wagering intent associated with checking odds. In some implementations, the intent classifier 145 can implement vector machines (SVMs), naive bayes, or deep learning architectures such as recurrent neural networks (RNNs) and transformers (BERT) to identify complex or ambiguous intents. In some implementations, the data processing system 105 can implement a machine-learning model, which can include one or more distinct language models 198. Each language model 198 can be trained on specific datasets related to different games, such as football, basketball, tennis, or baseball, among others. The language models 198 can process different wager types, including moneyline wagers, parlay wagers, and over/under wagers, automating the intent classification based on the user's prompt. In some implementations, the machine-learning models can be trained on large datasets of user prompts and their corresponding intents, for example, in wagering context.

The intent classifier 145 can process user prompts to extract the underlying intent or purpose. The intent classifier 145 can categorize the user's prompt into specific intents, such as placing a bet, checking odds, or requesting information about a specific game or team. In some implementations, the intent classifier 145 can receive various prompts corresponding to different intent classifications, such as asking for wager recommendations, odds information, or general inquiries about teams and games. The specific categories of intent may vary depending on the implementation. The intent classifier 145 can determine the actions to fulfill the user's request based on the classified intent. For example, when the data processing system 105 receives a prompt, such as "What are the odds for Flamingos to win tonight?", the intent classifier 145 can determine that the prompt is a request for wagering information, identify the specific wager type as a moneyline bet, and extract relevant details such as the team's name (in this example, Flamingos) and the game timeframe (in this example, tonight).

In some implementations, the intent classifier 145 may execute one or more language models 198 to classify or otherwise determine the intent of the prompt. In some implementations, the intent classifier 145 can access the evaluation metrics 195 to identify which language model 198 has the best performance in classifying intents of input prompts. For example, one or more evaluation datasets 180 can include specific evaluation prompts 185 and corresponding evaluation messages 190 that are used to generate evaluation metrics 195 that indicate the performance of each language model 198 in classifying intents of input prompts.

In classifying intents, the intent classifier 145 can access the evaluation scores 195 to identify which language model 198 has the best performance in classifying intents of prompts, and automatically provide the input prompt to that language model 198 for intent classification.

In such implementations, the language model 198 may generate structured output identifying a classification of the intent and one or more functions/actions/commands to be performed to satisfy the intent. The functions/actions/commands may include commands to search the wager opportunities 160 using one or more corresponding values of the prompt to identify a relevant wager opportunity 160 to satisfy the prompt. The functions/actions/commands may include commands to search/identify one or more webpages, electronic documents, or content items to satisfy the prompt. In some implementations, the functions/actions/commands may include indications that one or more aspects of the intent of the prompt cannot be classified. The aspects may be indicated, for example, in a natural language response message to the player that provided the corresponding input prompt.

In some implementations, based on the prompt or system-defined criteria, the intent classifier 145 can identify relevant wager opportunities from the storage 125. In some implementations, the intent classifier 145 can identify additional wager opportunities 160 (or data thereof) to combine with a candidate wager opportunity 160, for example, to generate a parlay wager opportunity 160. For example, the intent classifier 145 can identify potential legs for the parlay based on available betting options identified in the wager opportunities 160. In some implementations, the intent classifier 145 or the prompt receiver 135, depending on the implementation, can process player requests for payout information. For example, upon receiving a prompt about wager winnings, the intent classifier 145, via the data processing system 105, can cause the language model 190 to generate a data structure that includes the details of the payout based on the wager's outcome and odds. In some implementations, where the intent classifier 145 receives updates (e.g., updated odds for a specific wager), the intent classifier 145 can search through the wager opportunities 160 in the storage 125 to find the corresponding wager opportunity 160 based on identifiers (e.g., wager ID).

The data processing system 105 can include the profile manager 150. The profile manager 150 can be or include any script, file, program, application, set of instructions, or computer-executable code that is configured to create, modify, delete, or otherwise manage player profiles 170 stored within the storage 125. The profile manager 150 can include hardware, software, or any combination. The profile manager 150 can store and organize player information, including account details, preferences, and gaming history, among others. The profile manager 150 can generate profile information based on data received from the client systems 115. This configuration can allow the profile manager 150 to capture activity across different interactive applications and different devices, and store records of that activity in the player profile 170. The profile manager 150 can update credit balances, game statistics, and other relevant information based on the outcomes of games played by the client system 115. The profile manager 150 can receive data about game results from the client system 115 and use this information to make adjustments to the player profile 170. The profile manager 150 can store game statistics such as the number of wins, losses, and ties, as well as the player's average bet size, win percentage, and longest winning streak, among others. In some implementations, the profile manager 150 can store records of player interactions, including prompts, responses, or conversation histories, with the language model 198.

The data processing system 105 can include the model manager 155. The model manager 155 can train, fine-tune, update, re-train, or otherwise maintain one or more machine learning models (e.g., the language model 198, etc.). The model manager 155 can include hardware, software, or any combination thereof. The model manager 155 can facilitate the training of language models 198 on datasets and can fine-tune models for specific tasks or domains. The model manager 155 can manage the deployment of language models 198 in production environments and the integration of language models 198 with other systems and services. The model manager 155 can continuously monitor the performance of deployed language models 198, identify issues, and update language models 198. In some implementations, the model manager 155 can use various machine learning algorithms, including supervised learning techniques, to train/fine-tune/update one or more machine-learning models (e.g., the language model 198) using labeled data or one or more evaluation examples 180 to improve the prediction accuracy, classification capabilities, and intent determination of the language models 198. In some implementations, the model manager 155 can implement unsupervised learning techniques, such as clustering and association rule mining, to identify patterns in unlabeled data, and/or to generate labels for said unlabeled data. In some implementations, the model manager 155 can implement reinforcement learning techniques to update the language model 198 based on user-provided feedback or evaluation examples 180.

In some implementations, the model manager 155 can select language models 198 to process a received prompt based on the classified intent of the prompt. As described herein, the intent can correspond to a wager type, a live event type, a team identifier, or an athlete identifier, among any other intent described herein. Upon receiving the input prompt, the model manager 155, via the intent classifier 145, can identify the intent of the prompt. Upon identifying the intent of the prompt, the model manager 155 can reference a pre-defined mapping data structure 165 that associates different intent categories of input prompts with corresponding language models 198 that are best suited for processing those intents.

In some implementations, the model manager 155 can generate the mapping between intents and language models 198 based on the evaluation scores 195 generated by evaluating each of the language models 198. The mapping can be rule-based or machine-learned using techniques, such as clustering or classification algorithms to identify patterns in historical data. For example, if language model A has consistently performed well for football-related queries, the model manager 155 can associate the language model 198 with football-related intents, while another language model 198 can be mapped to basketball-related intents. In some implementations, the model manager 155 can map language models 198 based on wager types. For example, if language model B consistently generates accurate outputs for parlay wagers, the model manager 155 can associate the language model B with intents related to parlay bets. In another example, if language model C excels in processing moneyline wagers, the language model C can be mapped to moneyline-related intents. In some implementations, the model manager 155 can evaluate the complexity of the prompts when generating the mapping. For example, simple prompts, such as "What are the odds for the Red Hawks to win?", can be processed by a general-purpose language model, and more complex prompts, such as "Suggest a parlay bet combining three teams based on their recent performance and head-to-head records", can be mapped to a trained model that can process multi-layered queries.

In some implementations, the model manager 155 can generate candidate outputs to evaluate the performance of the language models 198. The candidate outputs can refer to a potential result or prediction generated by the language model 155 during training. In some implementations, the model manager 155 can generate a plurality of candidate outputs by combining the user input prompts with evaluation prompts 185 from the evaluation dataset 175. The evaluation prompts 185 can include pre-defined prompts that correspond to various wagering-related intents, and the user input prompts can be the specific prompts or requests submitted by the user. In this regard, the model manager 155 can retrieve a set of evaluation prompts 185 from the evaluation dataset 175 and combine the user input prompts with the retrieved evaluation prompts 185 in several ways. For example, the model manager 155 can concatenate the user's prompt to each evaluation prompt 185, add the user input prompt as contextual information, or modify the evaluation prompt 185 based on the user input prompt. For instance, if the evaluation prompt is "What are the odds on the Blue Hawks winning the championship?" and the user input prompt is "I'm considering betting on the Blue Hawks". The combined prompt can be "Given that you're considering betting on the Blue Hawks, what are the odds on them winning the championship?" The combined prompts can be provided as an input to the language model(s) 198 to generate a plurality of candidate outputs.

In some implementations, the model manager 155 can use a combination of user input prompts and historical wager opportunities, such as the wager opportunities 160 stored in the storage 125, to generate candidate outputs. The historical wager opportunities can include data such as past wagers placed by users, outcomes of those wagers, odds at the time of the wager, and relevant context such as teams, events, and sports. The model manager 155 can retrieve historical wager opportunities that are relevant to the user input prompt. For example, the model manager 155 can retrieve relevant historical wager opportunities based on keyword matching or contextual analysis (e.g., retrieving historical data related to the same sport, league, or event). The model manager 155 can integrate the retrieved wager opportunities with the user input prompt, as described herein. For example, if a user inputs the prompt "What are the odds for the Red Hawks winning this week?" the model manager 155 can retrieve relevant historical wager opportunities corresponding to the Red Hawks and similar events and combine that data with the input prompt. The combined prompt can be provided to the language model(s) 198, which can process the input and generate a plurality of candidate outputs based on historical trends, patterns, and probabilities.

In some implementations, the model manager 155 can generate a plurality of candidate outputs based on the player profile 170 and the evaluation prompts 185 or user input prompts, depending on the implementation. The player profiles 170, as described herein, can include information about each user/player, including betting history (such as previous wagers, outcomes, and amounts), preferences (such as favored sports, leagues, teams, or bet types), risk tolerance, and demographic information (such as age and location). The model manager 155 can retrieve, via the profile manager 150, the specific player profile 170 associated with the user, and can combine the profile information with the user input prompt. In some implementations, the model manager 155 can use the player profile 170 to provide additional context for the prompt. For example, if a user frequently wagers on basketball and inputs a prompt, "What are the best bets this weekend?", the model manager 155 can prioritize basketball-related wagers. After combining the player profile data with the user input prompt, the integrated information can be provided to the language model(s) 198. The language models 198 can process the prompt and generate a plurality of personalized candidate outputs based on the user's specific characteristics, preferences, and previous betting patterns.

In some implementations, the model manager 155 can determine evaluation scores for one or more language models 198 to determine the performance of each language model 198 in generating accurate and relevant responses to the evaluation prompts 185. For example, the model manager 155 can compare the evaluation message 190 of the evaluation example 180 with each of the candidate outputs generated by the language models 198. In some implementations, the model manager 155 can compare the wager recommendation from the evaluation example 180 (e.g., the correct or desired response) with the corresponding wager recommendation, included in the respective candidate output, generated by the language model 198. The model manager 155 can implement similarity metrics to quantify the semantic similarity between the evaluation message 190 of the evaluation example 180 and each candidate output. The similarity metrics can include cosine similarity, which measures the cosine of the angle between the vectors representing the texts, Levenshtein distance, which calculates the minimum number of edits required to transform one text into the other, or word embedding similarity, which uses techniques such as word2vec or GloVe to compare semantic similarity, among others.

Based on the similarity calculation, the model manager 155 can assign a score to each candidate output. A higher score can indicate greater similarity between the candidate output and the evaluation message 190. For example, given the evaluation prompt "What are the odds on the Red Hawks winning the championship?" and a corresponding evaluation message 190 providing the correct odds, the model manager 155 can score each candidate output generated by the language models 198 based on how accurately they reflect the correct odds. In some implementations, the model manager 155 can determine the evaluation scores for the language models 198 using a second evaluation example 180 corresponding to another intent. In this example, the second evaluation example 180 can indicate a distinct intent, such as a different type of wager or event, to determine the language models' performance under varying conditions. In some implementations, the model manager 155 can determine the evaluation scores based on the evaluation message 190 of a third evaluation example 180, which can include a combination of input prompts and historical wager opportunities. The third evaluation example 180 can allow the model manager 155 to determine how well the language models 198 generate candidate outputs by considering both the user input prompts and past wagering data.

In some implementations, the model manager 155 can aggregate the scores for all candidate outputs generated by each language model 198 to compute an overall evaluation score for that language model 198. The overall score can indicate the language model's average performance across the evaluation examples 180. The model manager 155 can implement one or more techniques to combine the evaluation scores, such as weighted averaging (e.g., where certain evaluation examples may carry more weight depending on their importance or relevance to specific tasks), ranking (e.g., where models are evaluated based on their relative performance across different evaluation examples), or threshold-based aggregation (e.g., where only candidate outputs exceeding a specific similarity threshold contribute to the evaluation score), among others.

In some implementations, the model manager 155 can update the assignment of language models 198 based on a pre-defined assignment criterion. The assignment criterion can use threshold values or statistical analysis to determine if an evaluation score associated with a language model 198 is satisfactory. When the evaluation score of a language model 198 satisfies the assignment criterion, the model manager 155 updates the data structure 165 that maps intents to language models 198. The update can include the addition of a mapping if the language model 198 has not been previously assigned to the intent, or a modification of an existing mapping if the language model's performance shows improvement or decline. Based on the update, the model manager 155 can select the language model 198 by referencing the updated data structure 165 based on the identified intent of a subsequent prompt. For example, when the model manager 155 receives a prompt from a client system 115 asking for betting odds on the upcoming "Blue Falcons vs. Steel Titans" basketball game, the model manager 155 can evaluate one or more language models 198 based on how accurately they determine the odds for similar historical games. If the evaluation score 195 for a specific language model 198 satisfies the pre-defined threshold, the model manager 155 can update the data structure 165 to assign the language model 198 to the odds prediction intent, for example. In some implementations, where the language model's score improves after subsequent evaluations, the existing mapping can be modified to reflect its enhanced performance. In the future, when a user submits a prompt, such as "What are the odds for the Blue Falcons game this weekend?", the model manager 155 can automatically select the specific language model 198 by referencing the updated mapping to generate a contextually accurate and relevant response based on previous performance of the language model 198 in similar contexts.

In some implementations, the model manager 155 can provide the language models 198 with various evaluation prompts 185 to evaluate the performance of the language models 198 on various tasks. The prompts can be used to evaluate various aspects of the language model's capabilities, such as understanding context, where the prompt can indicate wagering-related intent, causing the language model 198 to comprehend and respond. In some implementations, based on the evaluation prompts 185, the language model 198 can be used to generate specific outputs, such as wager recommendations, odds calculations, or team analysis. In some implementations, the model manager 155 can evaluate the ability of the language model 198 to follow instructions, where the prompt can provide guidelines for the language model 198 to execute, by comparing the output of the language model 198 to the corresponding evaluation message(s) 190 to calculate various evaluation scores 195, as described herein. For example, if tasked with recommending a parlay bet for a basketball game between the "Thunderbolts" and the "Ironclads", the language model 198 can generate a recommendation such as "Wager on the Thunderbolts to win and the Ironclads to lose", based on recent or historical data.

The model manager 155 can evaluate the contextual understanding of the language model 198 to determine that the language model 198 correctly understood the task indicated in each evaluation prompt 185. In some implementations, the model manager 155 can evaluate the relevance of a recommendation based on the selected teams and whether the recommendation constitutes a valid parlay. In some implementations, the model manager 155 can measure accuracy by validating that the recommendation is based on recent performance data. In some implementations, the model manager 155 can determine completeness based on whether the recommendation includes relevant details such as odds and potential payout. If the response satisfies all criteria, the model manager 155 can assign a higher evaluation score 195 (e.g., 1.0) according to a particular evaluation technique, while incorrect or incomplete recommendations can result in a lower score (e.g., 0.0) according to the particular evaluation technique.

In some implementations, the model manager 155 can train/update/fine-tune the language model 198 or other machine learning components to generate text formats, make recommendations, understand user intents, and personalize the user experience based on the evaluation example 180. The model manager 155 can implement various machine learning techniques, including supervised, unsupervised, and reinforcement learning, to continuously improve the performance of language model 198. In some implementations, the model manager 155 can provide instruction and training examples to the machine learning system 120, to cause the machine learning system 120 to train/fine-tune/update the language model(s) 198 according to the techniques described herein.

In some implementations, the model manager 155 can maintain a plurality of adapters, each of which can correspond to one or more language models 198. For example, each adapter can be associated with a specific language model 198 and customized for particular tasks, such as processing wagering-related intents. The model manager 155 can apply an adapter to a base language model, which can be a pre-trained language model that serves as the foundation for customization. The adapter can be trained on a specific dataset, such as training examples, an evaluation dataset, articles, or historical data, to fine-tune the model's performance on a specific task. Once trained, the adapter's parameters can be integrated into the base model's architecture to generate a customized version of the base language model, directed to the specific task. For example, the base language model can be a large model trained on general text and code, but by applying an adapter trained on wagering knowledge, the customized language model can become more proficient at processing wagering-related prompts, for instance.

In some implementations, the model manager 155 can use Low-Rank Adaptation (LoRA), Quantized Low-Rank Adaptation (QLoRA), or other adapters to train/update/fine-tune the language model 198. The model manager 155 can use LoRA to address the challenge of fine-tuning large models without updating all parameters. For example, instead of fine-tuning all the weights in the model, the model manager 155 can inject trainable low-rank matrices into each layer of the transformer architecture to reduce the number of trainable parameters or the computational load. In some implementations, the model manager 155 can extend LoRA by incorporating quantization techniques through QLoRA. For example, the model manager 155 can combine quantization with low-rank adaptation to reduce computational load. In some implementations, the model manager 155 can use prefix tuning, which adds trainable vectors to the input sequence to guide the model's attention. In some implementations, the model manager 155 can use p-tuning, which uses continuous prompts to fine-tune the model. In some implementations, the model manager 155 can use LongLoRA, a variant of LoRA, to manage longer sequences.

In some implementations, the model manager 155 update the data structure 165 based on one or more evaluation processes for different language models 198. For example, the model manager 155 may initiate or otherwise execute evaluation processes using the evaluation datasets 175 (which can correspond to different intents, prompt types, and/or tasks) to generate evaluation metrics 195 for each language model 198. To do so, the model manager 155 can initiate one or more evaluation processes for an evaluation dataset 175 by providing the evaluation prompts 185 as input to a corresponding language model 198. The output of the language model given the evaluation prompt 185 can be evaluated against the corresponding evaluation message 190 to generate a score. Any number of evaluation scores can be generated for each prompt, and may include exact match scores, precision scores, recall scores, F1 scores, ROUGE scores, RAGAS scores, or any other evaluation score 195.

In some implementations, the model manager 155 can average each type of evaluation score for a language model 198 generated using all evaluation examples 180 in an evaluation dataset 175. These average scores can be stored as the evaluation scores 195 for that particular dataset 175, and may represent the respective performance of the language model 195 for the intent, task, or operation to which that evaluation dataset 175 corresponds. The model manager 155 can repeat this process for evaluation dataset 175 for each intent, task, or operation to generate average evaluation scores 195 for each intent, task, or operation for a given language model 198. The model manager 155 can repeat this process to evaluate all language models 198A-198N, thereby evaluating the performance of each language model 198 for each possible intent, operation, or task represented in corresponding evaluation datasets 175.

Once the evaluation scores 195 are generated, the model manager 155 can generate a mapping in the data structure 165 that maps between each evaluated intent, task, or operation and an identifier of the language model 198 that produced the highest/best evaluation score(s) 195 for that intent, task, or operation. In some implementations, the data structure 165 can store a ranking of language models 198 for each intent, task, or operation according to the evaluation scores 195. In some implementations, a composite evaluation score 195 for a particular task/operation/intent and language model 198 can be determined based on a weighted sum of each evaluation score 195 generated for that the evaluation score 195 for the task/operation/intent and language model 198 (e.g., a weighted sum of recall score, precision score, other scores, etc.). The weights assigned to each type of score can be hyperparameters specified via configuration settings of the data processing system 105, which may be modified via operator input, in requests received from external computing devices, or any other data described herein.

In some implementations, the model manager 155 can generate/update the data structure 165 by accessing the evaluation scores 195 for each language model 198 and ranking/sorting the evaluation scores 195 according to performance for each intent. The model manager 155 can then update the data structure 165 to include a mapping between an identifier of the language model 198 having the highest evaluation score 195 for the corresponding intent/task/operation. When a prompt is received and the intent of the prompt is classified, the model manager 155 can access the data structure 165 to retrieve the identifier of the language model 198 that best performs on that intent/task/operation, and use the identified language model 198 to process an input context generated using the prompt. The model manager 155 can perform further evaluation iterations, re-evaluate each of the language models 198A-198N, and/or update the data structure 165 with up-to-date mappings on a periodic basis, in response to identifying or receiving additional evaluation datasets 175, and/or in response to requests(s) from operator(s) of the data processing system 105 and/or external computing systems.

In some implementations, where it is indicated in the data structure 165 that a language model 198 is associated with a specific intent type, such as "inquire about football odds," the model manager 155 can compare the classified intent with the intent types of the available language models 198 and select the language model 198 that best matches the classified intent. For example, if the prompt relates to American football, the model manager 155 can select the language model 198 that performs best for that intent. After identifying the language model 198, the model manager 155 can cause the machine learning system 120 or the data processing system 105 to execute the selected language model 198. The selected language model 198 can process the prompt (or an input context generated therefrom) and generate a response. In some implementations, the model manager 155 can select the language model 198 based on the complexity of the prompt (e.g., whether it's a simple question or a complex request), and the historical performance of the language model 198 on similar intents as indicated in the data structure 165.

In some implementations, the data structure 165 can include information for processing prompts for any corresponding intent. In one example, different intents may be associated with different system prompts or other additional information that may be included in an input context for one or more language models 198. In such implementations, the model manager 155 can automatically generate an input context using a received prompt and the additional data indicated in the data structure 165 that corresponds to the task/operation/intent of the received prompt. This information may include task-specific instructions for a language model 198, particular input or context data relating to the intent, operation, or task, or may indicate one or more actions (e.g., an indication to search for information resources, wager opportunities 160, etc.) to be performed by the data processing system 105 to retrieve data for inclusion in the input context with the received prompt.

In some implementations, the data structure 165 can indicate a mapping between a prompt intent and a corresponding service. For example, the data processing system 105 may implement additional services that do not necessarily implement one or more language models 198, such as search operations or other processing operations. In some implementations, rather than indicating an association to a language model 198, the data structure 165 can indicate an association between one or more intents and one or more services/functions that may be implemented by the data processing system 105. In one example, the intent may indicate that the prompt is a search query, and the data processing system 105 can automatically perform a search over one or more information resources using the prompt based on the association between the search query intent and a searching operation identified in the data structure 165.

The client system 115 (e.g., associated with a client device) can execute an application that communicates with the data processing system 105. The application can present one or more application interfaces 196. The application interface 196 can include a set of rules or protocols that allow different software programs or systems to communicate with each other. The application interface 196 can provide user interfaces to facilitate interaction. Users can input information, view content, or initiate actions through the application interface 196. In some implementations, the application interface 196 can be associated with a particular client application that communicates with the data processing system 105 to process user prompts.

The client application can include an application executing on each client system 115. The client application can include a web application, a server application, a resource, a desktop, or a file. In some implementations, the client application can include a local application (e.g., local to a client system 115), a hosted application, a software-as-a-service (Saas) application, a virtual application, a mobile application, and other forms of content. In some implementations, the client application can include or correspond to applications provided by remote servers or third-party servers. In some implementations, the client application can process user prompts associated with wagers or specific sports-related entities.

The application interface 196 can include graphical user interfaces or graphical elements that present content items, interaction modes, outcomes, or wager recommendations. The application interface 196 can dynamically configure the graphical user interface based on the user's activities, preferences, or the identification of prompts associated with wagering-related activities. The application interface 196 can receive interactions from the user, such as selections or specifications of wagers to be placed through the application interface 196. In response to receiving the interactions, the client application presenting the application interface 196 can communicate with the data processing system 105 to execute the placement of wagers. In some implementations, the application interface 196, via the client system 115, can cause the data processing system 105 to update the storage 125 to include the details of the wager counts. In some implementations, upon interaction with a graphical element, the application interface 196, via the data processing system 105, can cause the profile manager 150 to update a player profile 170 associated with the client system 115 according to the wager placed.

The client communicator 197 within the client system 115 can be similar to, and include any of the structure and functionality of, the device communicator 140 described in connection with the data processing system 105. For example, the client communicator 197 within the client system 115 can communicate with the data processing system 105 via the network 110 using one or more communication interfaces to carry out the various operations described herein. The client communicator 197 can be compatible with particular content objects and can be compatible with particular content delivery systems corresponding to particular content objects, structures of data, types of data, or any combination thereof.

The machine learning system(s) 120 are shown as including the language models 198A-198N. Each language model 198A-198N can have different attributes (e.g., different numbers of parameters, different model architectures, different training data used for training, etc.). In some implementations, each machine learning system 120 can store, maintain, and execute a respective language model 198. In some implementations, a machine learning system 120 can store, maintain, and execute multiple different language model(s) 198, which may be accessed using one or more API calls or other communication interfaces. In some implementations, one or more language models 198 may be stored, maintained, or otherwise executed by the data processing system 105, while other machine-learning models 198 may be stored, maintained, or otherwise executed by one or more machine learning systems 120.

Each language model 198 can be trained on text data. For instance, the language models 198 can be trained/updated/fine-tuned to perform a variety of text processing tasks, including, but not limited to, generating text, formatting instructions, comprehending and processing natural language input, and responding to prompts with contextually relevant information. Each language model 198 can include a transformer architecture, such as a generative pre-trained transformer (GPT) architecture. The transformer architecture can include an encoder that can process the input text and a decoder that can generate the output text. Each language model 198 can include multiple layers that can operate to process and generate text. For example, embedding layers can convert words or tokens into dense vectors of fixed size, attention layers can use mechanisms such as self-attention to weigh the importance of different tokens in a sequence, and feedforward layers can apply transformations to the data to learn complex patterns. In some implementations, each language model 198 can use a self-attention mechanism to weight different parts of the input sequence when generating predictions. Each language model 198 can be trained/fine-tuned/updated using various text datasets.

Natural language input can have a syntactic structure in which individual words, collections of words (e.g., phrases), or relative positions of words (e.g., word order) can indicate specific meanings. Each language model 198 can be trained/updated/fine-tuned to parse sentences into their grammatical components to understand the structure and relationships between words. Each language model 198 can use phrasing structure rules that define how words combine to form phrases and sentences. In some implementations, each language model 198 can be trained/updated/fine-tuned to transform sentence structures into more complex ones, such as turning a statement into a question, which can include a transformation that the language model 190 can execute to enhance understanding and generate varied outputs.

In some implementations, each language model 198 can receive an input context, which may be derived from evaluation prompts 185 related to evaluation examples 180 or from user input prompts, including user-specific information and intent related to wager opportunities 160. In some implementations, each language model 198 may include or may be associated with a tokenizer model, which can convert a text-based or media-based input context into a sequence of tokens compatible with an input layer of the corresponding language model 198. The input context may include natural language, structured data, or combinations thereof, and may specify instructions for the model to generate particular output (e.g., formatting instructions 165, etc.) according to the techniques described herein. Each language model 198 can receive an input context generated via the intent classifier 145, the model manager 155, or any other component of the data processing system 105, as described herein. As described herein, the input context can include relevant wager opportunities 160 identified based on the prompt. The data processing system 105 can select one or more language models 198 to process the input context, as described herein. The corresponding machine learning system(s) 120 can execute the selected language model(s) 198 to process the input context. The selected language model(s) 198 can generate an output data structure including one or more tokens representing an output message generated based on the input context. In some implementations, tokens or combinations of tokens can indicate special control data for the language model(s), including but not limited to the beginning/end of formatting instructions, the beginning of prompts/natural language text, or the beginning/end of wager opportunities, deep links, or any other type of data described herein.

In some implementations, the data processing system 105 can identify wager recommendations for inclusion in one or more input contexts based on a search operation of the wager opportunities 160 using the user input prompt, depending on the implementation. For example, the data processing system 105 can perform a search operation using algorithms such as keyword matching or semantic search to identify relevant wager opportunities 160 to the user's input prompt for inclusion in the input context. After generating the input context, the selected language model 198 can process the input context. The input context can include user-specific information such as preferences, wagering history, and risk tolerance, as well as the input prompt. In some implementations, the input context can include the intent related to wager opportunities 160, such as the desired wager type, team, or event.

Each language model 198 can process a wide range of input formats, including but not limited to text, audio, images, video, or other modalities. In some implementations, based on the input context, one or more language models 198 can generate output, which can range from simple text responses to complex data structures. In some implementations, a language model 198 can use the input prompt to iteratively predict the next token, word, or phrase to generate responses in response to prompts. In some implementations, a language model 198 can generate instructions or commands that automatically invoke tools or functions to perform specific tasks or operations, such as retrieving detailed odds or player performance data from external databases. In some implementations, one or more language models 198 can generate formatting instructions that define the visual attributes of graphical elements, such as how to present content such as wager details or personalized recommendations based on the user's preferences and input. In some implementations, based on the input prompt, one or more language models 198 can generate a data structure, including details such as text content, layout specifications, and visual or graphical elements.

In some implementations, one or more language models 198 can process prompts and extract relevant information when receiving an update from a user, such as removing a wager, removing legs, updating an existing wager, or adjusting a wager opportunity, among others. In some implementations, the language model 198 can parse the prompt to extract relevant details, such as the player ID, wager identifier, wager opportunity, and other desired changes. Based on the extracted information, the language model 198 can generate a command for the data processing system 105 to update the data structure associated with the player profile 170. In some implementations, the language model 198 can generate a command that includes a token, character, string, or phrase that functions as a signal or identifier for the data processing system 105. In some implementations, one or more language models 198 can implement a specific format or syntax for the generated command, such as JSON or a custom format. The generated command for the data processing system 105 can include an identifier indicating the type of action to be performed (e.g., update wager), the player ID (e.g., identifier for the player profile), the wager identifier (e.g., identifier for the specific wager being modified), the selected wager opportunity, the desired wager amount, and any other relevant details.

In some implementations, the response or output message generated by the selected language model 198 can include text data that is responsive to the prompt. For example, if the prompt is "What are the odds on the Red Hawks winning the championship?", the selected language model 198 can generate the output message, "The Red Hawks are currently favored by 4.5 points to win the championship, with the over/under set at 52.5 points". The data processing system 105 can provide the output message to the client device 115 for presentation in a graphical user interface in response to the prompt. For example, the data processing system 105, upon receiving the output from a language model 198, can format the output message in a manner that is suitable for presentation in the graphical user interface (GUI), which can include text formatting (such as font, size, and color), layout organization, and hyperlinking relevant resources, among others. The data processing system 105 can transmit the formatted output message to the client system 115, associated with the client device, for presentation.

In some implementations, the data processing system 105 can directly execute one or more of the language models 198A-198N as a component. The data processing system 105 can select one of the language models 198A-198N based on various factors described herein. In some implementations, the data processing system 105 can select one of the language models 198A-198N according to factors such as computational complexity, efficiency, and task-specific capabilities, among other attributes. The data processing system 105 can use data cleansing, tokenization, or other standardization techniques to maintain compatibility with different language models 198. In some implementations, the data processing system 105 can implement batch processing, data streaming, or asynchronous data management techniques to manage data flow into any of the language models 198. In some implementations, where the data processing system 105 is using an API to access the functionality of any of the language models 198, the data processing system 105 can integrate API calls into its operational workflow. In some implementations, where the data processing system 105 is deploying one or more language models 198 on local infrastructure, the data processing system 105 can load one or more language models 198 (or adapters corresponding thereto) into system memory. The data processing system 105 can format incoming data to match the input structure of a selected language model 198.

Figure 2:
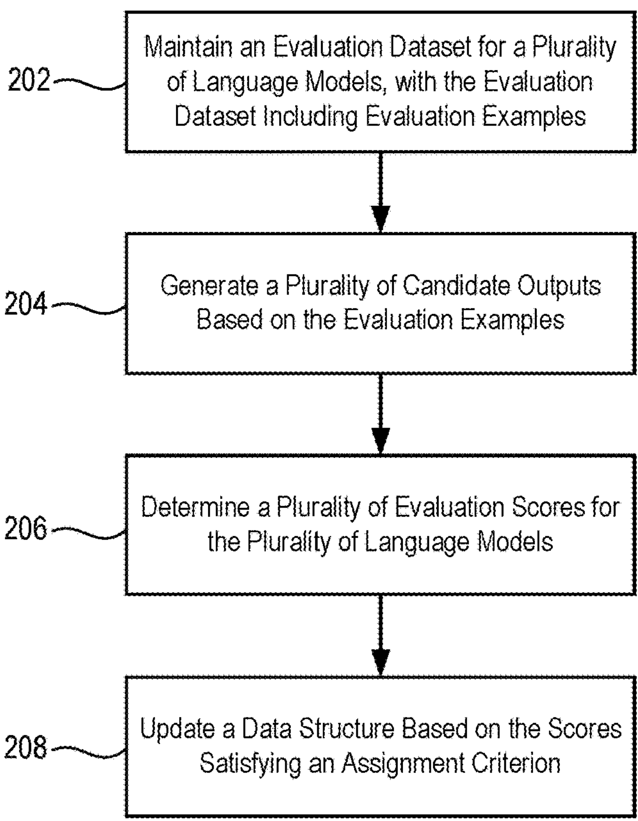
FIG. 2 illustrates an example flow diagram of a method for monitoring and evaluating language performance according to real-time data in a distributed networking environment, in accordance with one or more implementations.

B. Systems and Methods for Monitoring and Evaluating Language Performance According to Real-Time Data in a Distributed Networking Environment Referring now to FIG. 2, depicted is an illustrative flow diagram of a method 200 for monitoring and evaluating language performance according to real-time data in a distributed networking environment. The method 200 can be executed, performed, or otherwise carried out by a server or a system. A data processing system (e.g., the data processing system 105) can be remote to one or more client systems (e.g., the client system 115) and one or more machine learning systems (e.g., the machine learning system 120) and can communicate with the one or more client systems or the one or more machine learning systems via a computer network (e.g., the network 110). In a brief overview of method 200, the server or the system can maintain an evaluation dataset for a plurality of language models, with the evaluation dataset including evaluation examples (STEP 202), generate a plurality of candidate outputs based on the evaluation examples (STEP 204), determine a plurality of evaluation scores for the plurality of language models (STEP 206), and update a data structure based on the scores satisfying an assignment criterion (STEP 208).

In further detail of method 200, the data processing system can maintain an evaluation dataset for a plurality of language models, with the evaluation dataset including evaluation examples (STEP 202). The evaluation dataset is a collection of evaluation examples used to evaluate the performance of language models with respect to different tasks, operations, or prompt intents, as described herein. Each evaluation example can include a respective input prompt. The input prompts are queries or requests that the language models are presented with to simulate prompts corresponding to respective intents, tasks, or operations. In one example, an input prompt for an evaluation example can indicate an intent relating to wager opportunities. The intent can include one or more elements, such as a wager type, a live event type, a team identifier, or an athlete identifier, among others. For example, an input prompt for an evaluation example can state, "Recommend a parlay wager for the Thunderbolts vs. Ironclads game", where the intent indicates the wager type (e.g., parlay wager) and the live event type (a specific game between two teams).

The evaluation example can include a respective output message that operates as a ground truth output for the corresponding input prompt against which one or more language models are to be evaluated. The respective output messages can be expected or desired responses to the input prompts in the evaluation dataset. For instance, if the input prompt is "What is a good bet for the Thunderbolts vs. Ironclads game?", the output message can provide relevant information such as recent team performance and suggest a wager recommendation like, "Bet on the Thunderbolts to win by 7 points, with odds of +150". In some implementations, the respective input prompt of the evaluation example can include multiple wager recommendations. For example, the respective input prompt can include pre-defined prompts that correspond to various or multiple wagering-related intents, such as betting on the point spread, total points, moneyline, or parlays, among any other type of intent, task, or operation.

The respective output message can provide relevant and accurate information aligned with the intent of the corresponding input prompt of the evaluation dataset. In some implementations, the data processing system can maintain historical wager opportunities to facilitate the generation of evaluation examples for one or more evaluation datasets. For example, the historical wager opportunities can correspond to past wagering opportunities that may be included in input contexts of different evaluation examples, including details such as types of wagers, the odds offered, the outcomes of those wagers, and the volume of wagers made on specific events or outcomes. Different evaluation datasets, each with corresponding sets of evaluation examples with input prompts and output messages, can be maintained for different intents, tasks, and operations. The different evaluation datasets can be used to determine the performance of specific language models when operating on different prompt intents.

The data processing system can generate a plurality of candidate outputs using the plurality of language models and based on the evaluation examples (STEP 204). For example, the data processing system can facilitate the generation of candidate outputs by providing the input prompt/input context of each input evaluation example (e.g., selected for a particular evaluation iteration, task, operation, or intent, as described herein) as input to a set of language models. Each language model can generate the candidate outputs as output, which are to be compared to corresponding evaluation messages of the evaluation example(s) to determine evaluation scores (e.g., evaluation scores 195) for the language models. The language models can be executed according to the techniques described herein. Any number of evaluation examples can be provided to the language models as input to generate any number of corresponding candidate outputs.

In some implementations, the data processing system, via the language model, can generate the wager recommendations based on a search operation of historical wager opportunities maintained as part of, or in association with, the corresponding evaluation sets. The historical wagers may be searched using one or more suitable searching techniques, which may be specified to one or more language models in some implementations. The wager opportunities for a given input prompt of an evaluation example can be included in the input context for the evaluation example, to simulate a look-up process for a wager opportunity following classification of the input prompt as having an intent for requesting wager opportunities. For example, the data processing system can retrieve historical data by accessing a storage of past wagers, outcomes, and other relevant information. The data processing system can perform a search operation using algorithms such as keyword matching or semantic search to identify historical data relevant to the input prompt of the evaluation example. The search operation may be specific to the language model being evaluated. Corresponding data relating to one or more expected wager opportunities can be stored as part of the corresponding evaluation message of the evaluation example.

The data processing system can determine a plurality of evaluation scores for the plurality of language models (STEP 206). The data processing system can determine the evaluation scores for each language model based on the respective output message of the evaluation example and the candidate output. The evaluation score can correspond to a specific language model. For example, the data processing system can determine the evaluation scores for each language model based on how closely the candidate output matches the expected output. A higher score can be assigned to a language model that provides a response that aligns more accurately with the expected output. In some implementations, the data processing system can determine the evaluation scores based on a semantic similarity between the respective output message of the evaluation example and the candidate outputs. In some implementations, the data processing system can determine the evaluation scores by comparing the meaning of the candidate outputs to the expected output. A higher semantic similarity score can indicate that the generated output is more closely aligned with the expected output in terms of meaning and content.

In some implementations, the data processing system can determine the evaluation score corresponding to the language model based on a comparison of the wager recommendation and a corresponding wager recommendation included in a respective candidate output generated by that specific language model. The data processing system can determine the wager recommendation generated by the language model that corresponds to the expected or correct recommendation from the evaluation example. The data processing system can compare the two recommendations based on factors, such as exact match, F1 score, recall, precision, ROUGE, among others. Based on the comparison, the data processing system can assign an evaluation score to the language model. A higher score can indicate that the language model's recommendation is more accurate and relevant.

In some implementations, the data processing system can determine the evaluation scores for the language models using another evaluation example corresponding to a different intent. For example, the data processing system can use additional evaluation examples to evaluate how well the language models perform across various wagering-related tasks, or other types of intents, operations, or tasks. For example, in the initial evaluation, the data processing system can evaluate the language models on their ability to generate wager recommendations based on simple queries, such as "What are the odds on the Thunderbolts winning?" In a second evaluation, the data processing system can evaluate the language models using more complex queries, such as those involving multiple teams, specific wager types, or conditional statements, such as "What are the odds of the Thunderbolts winning if the Ironclads lose?" By comparing the candidate outputs to the expected outputs, the data processing system can assign evaluation scores based on how well each language model processes the increasing complexity of the tasks.

In some implementations, the data processing system can determine the evaluation scores based on the respective output message of an evaluation example and the candidate outputs generated using a combination of input prompts and the historical wager opportunities. For example, the data processing system can generate candidate outputs by using the user input prompts and relevant historical wager data and can evaluate how well the language models process this combined information to generate accurate and relevant recommendations. A higher score can indicate that the generated output aligns more closely with the expected output, indicating the language model's ability to effectively use both the input prompt and historical wager opportunities.

The data processing system can update a data structure (e.g., the data structure 165) based on the scores satisfying an assignment criterion (STEP 208). The data processing system can dynamically adjust the mapping between language models and intents based on the performance of the language models. For example, the data processing system can evaluate the performance of each language model on various intents by generating evaluation scores. In some implementations, the data processing system can use an assignment criterion, which can be a pre-defined threshold or condition, to determine if a language model's performance is satisfactory for a specific intent. If the evaluation score of a language model satisfies or exceeds the assignment criterion, the data processing system can update the data structure that maps intents to language models. In some implementations, the update can include adding or modifying entries, or reordering/re-determining the mappings such that the most effective language model is selected for each task.

Once the data structure is updated, the data processing system can select the appropriate language model for future input prompts based on the identified intent. For example, upon receiving an input prompt from a client device, the data processing system can select the language model assigned to the identified intent. The selected language model can be used to generate wager recommendations corresponding to the input prompt. For instance, if a user submits the prompt, "What are the odds on the Thunderbolts winning the next game?", the data processing system can identify the intent as an inquiry about the odds for a specific team in a sports event. The data processing system can determine that the intent corresponds to a straight bet, for example, the user is interested in wagering on a single outcome (e.g., the Thunderbolts winning). The intent can relate to a live event type, for example, a game between the Thunderbolts and another team, and the data processing system can identify the team identifier as the Thunderbolts. The data structure can map the associated intent, such as an inquiry about odds, to a language model specialized in generating sports-related odds. The data processing system can execute the appropriate language model, which can process the prompt and generate wager recommendations for the Thunderbolts game.

Figure 3:
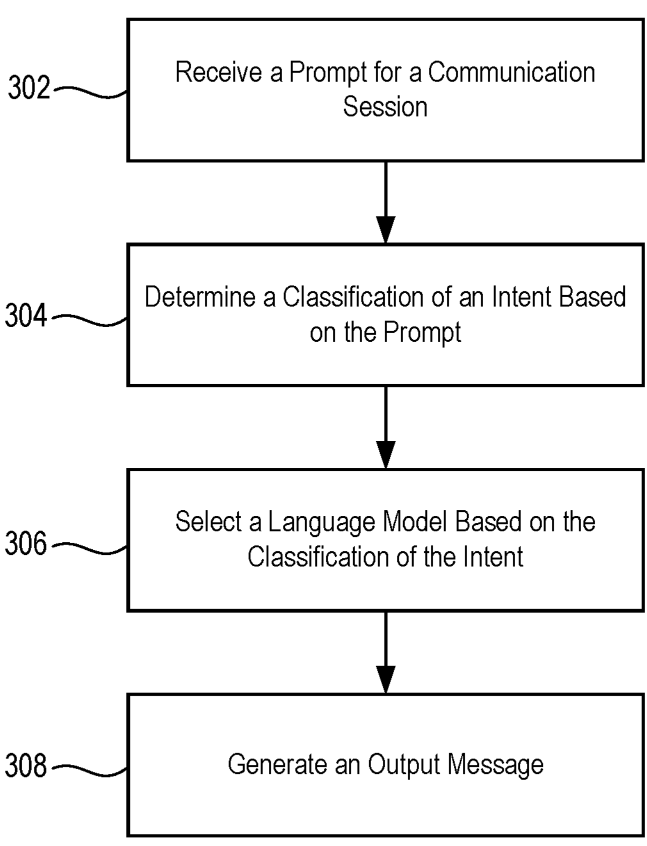
FIG. 3 illustrates an example flow diagram of a method for routing machine-learning prompts in a distributed networking environment, in accordance with one or more implementations.

C. Systems and Methods for Routing Machine-Learning Prompts in a Distributed Networking Environment Referring now to FIG. 3, depicted is an illustrative flow diagram of a method 300 for routing machine-learning prompts in a distributed networking environment. The method 300 can be executed, performed, or otherwise carried out by a server or a system. A data processing system (e.g., the data processing system 105) can be remote to one or more client systems (e.g., the client system 115) and one or more machine learning systems (e.g., the machine learning system 120) and can communicate with the one or more client systems or the one or more machine learning systems via a computer network (e.g., the network 110). In a brief overview of method 300, the server or the system can receive a prompt for a communication session (STEP 302), determine a classification of an intent based on the prompt (STEP 304), select a language model based on the classification of the intent (STEP 306), and generate an output message (STEP 308).

In further detail of method 300, the data processing system can receive a prompt for a communication session (STEP 302). A prompt can refer to the initial input or query provided by the user that directs the data processing system to process and generate relevant information based on the user's request. The prompt can be received from a client device associated with a client system. A session can refer to a conversational interaction between a user and the data processing system. A session can be initiated when a user accesses the application and concluded upon logout or application closure. Each session can be identified and tracked. In some implementations, a communication session can be a conversational record stored in a player profile associated with the client device. The client device may transmit a request to create a communication session to the data processing system, and the data processing system can generate a data structure to store data of the communication session.

As prompts are received and corresponding messages are generated, the communication session can be updated to include the prompts and responses exchanged between the user and the data processing system. For example, upon a user interaction with an interactive element presented by an application, such as clicking a button or entering text, a prompt can be generated and added to the conversation record associated with the session. The data processing system can process the prompt and generate a corresponding response, which can be appended to the conversation record.

In some implementations, the data processing system can establish a communication session with the client device using various protocols, such as HTTP, WebSocket, or other network-based communication methods. The connection can allow for the exchange of data and messages. In some implementations, the data processing system can identify or record the specific client device engaged in the communication session.

The data processing system can determine a classification of an intent based on the prompt (STEP 304). The data processing system can classify the intent corresponding to an output type of a plurality of output types. The output types can indicate predefined categories that guide the response generation. For example, output types can include providing odds information, suggesting wager recommendations, explaining rules and regulations of sports or wager types, or providing general information such as facts or statistics about teams, players, or events. For instance, if the user submits the prompt, "What are the odds on the Thunderbolts winning the championship?", the data processing system can classify the intent as "inquire about odds" and select the corresponding output type to generate an accurate response.

In some implementations, the data processing system can determine the classification of the intent based on a set of predetermined keywords. The data processing system can extract relevant features from the prompt, such as keywords, entities, and contextual clues, among others. For example, if a user submits the prompt, "What are the odds for the Red Hawks in the next game?", the data processing system can identify the keyword (e.g., odds) and the entity (e.g., Red Hawks). The data processing system can process the context of the prompt to determine the user's intent, such as inquiring about odds for a specific team in an upcoming game. Based on this analysis, the data processing system can classify the intent and generate a response accordingly. Any suitable intent classification technique may be used, including any such technique described in connection with FIG. 1, including, for example, via the use of one or more machine learning models (e.g., language models, other machine learning models, etc.).

In some implementations, the data processing system can determine the classification of the intent using a machine-learning model. The machine-learning model can include one or more language models. Each language model can be distinct, with each trained on a specific dataset related to different types of games, such as football, basketball, golf, baseball, tennis, or hockey, among others. In some implementations, each language model can be trained to process different wager types, such as moneyline wagers, parlays, or over/under wagers, among others. The data processing system can execute the machine-learning model to automate the intent classification. The machine-learning model, including one or more language models, can be trained on a dataset of labeled examples. Each example can include an input prompt and its corresponding intent. The language models can be used to process prompts and accurately determine the user's intent.

In some implementations, the data processing system can classify prompts as corresponding to one of many different possible intent classifications/categories, each of which may be identified as corresponding one or more language models (e.g., the best-suited language models for the corresponding intent). The specific categories may vary depending on the implementation. For example, a user can submit informational prompts such as, "What are the odds on the Red Hawks winning the championship?", which can be classified as an inquiry about odds. Another type of prompt can include recommendation requests, such as "Can you suggest a parlay bet for tonight's Thunderbolts and Steel Titans games?", classified as a request for a wager recommendation. In some implementations, the data processing system can process rule explanations, such as "What is a teaser bet in soccer?", where the intent can be to seek an explanation of betting rules. In some implementations, the data processing system can process prompts related to account management, such as "How do I add funds to my betting account?", which can be classified as an account-related information request.

The data processing system can select a language model based on the classification of the intent (STEP 306). For example, each language model can be associated with a specific intent type (e.g., in the data structure 165, etc.). In some implementations, the data processing system can select a first language model, for example, when the classification of the intent matches the intent type of the first language model. For example, if the user's input prompt is "What are the odds for the Thunderbolts winning their next game?", the data processing system can determine that the user's intent is to inquire about odds for a specific team in a sports event. The data processing system can compare the classified intent with the intent types associated with the different language models. If language model A is trained on football statistics and betting, and language model B is trained on basketball analytics and wagering, the data processing system can select the language model A, as the language model A is associated with the intent type "inquire about football odds", for example. In some implementations, a language model can be associated in the data structure 165 with a specific intent type (e.g., identifying the language model as the best performing model for the corresponding intent), such as information requests, while another language model can be associated with an intent type corresponding to recommendation requests. The data processing system can compare the classified intent with the intent types associated with the available language models and select the language model that best matches the classified intent, such that information requests and recommendation queries are processed by the most suitable language model.

In some implementations, the data processing system can generate a data structure (e.g., the data structure 165) indicating which language model is associated with which intent type, for example, based on historical prompts and corresponding historical output messages generated by language models. The data structure can function as a mapping between specific intents and the suitable language models for processing those intents. The data structure can be updated according to evaluation processes that determine which language models are best suited to process a prompt having a given intent. In some implementations, the language models can be In some implementations, the data processing system can maintain a plurality of adapters. Each adapter can correspond to one or more language models. In some implementations, each adapter can be associated with a specific language model. For example, a first adapter can correspond to the first language model. The data processing system can apply the first adapter to a base language model to generate the first language model, for example. The base language model can be a pre-trained language model that provides the foundation for the customized model. In this regard, the adapter can be trained on a dataset specific to the desired task. The trained adapter can be applied to the base language model, for example, by integrating the adapter's parameters, learned during the training phase, into the base model's architecture. The resulting model can be a customized version of the base language model, directed to the specific task. In some implementations, each adapter can include a low-rank adaptation data structure or a quantized low-rank adaptation data structure, to reduce the number of parameters in the adapter, which can reduce the number of parameters and improve the model's performance. In these examples, each adapter may be trained/updated to process prompts of a given intent. When a prompt is received that is classified as corresponding to a given intent, task, or operation, the data processing system can access and load the corresponding adapter in connection with the corresponding language model indicated in the data structure, and process the prompt (or an input context generated therefrom) using the language model with the adapter.

The data processing system can generate an output message (STEP 308). The data processing system can generate the output message using the language model selected based on the intent of the prompt. The output message can include text data that is responsive to the prompt. For example, if the prompt is "What are the odds on the Red Hawks winning the championship?", the selected language model can generate the output message, "The Red Hawks are currently favored by 4.5 points to win the championship, with the over/under set at 52.5 points". The data processing system can provide the output message to the client device for presentation in a graphical user interface in response to the prompt. The data processing system can format the output message in a manner that is suitable for presentation in the graphical user interface (GUI), which can include text formatting (such as font, size, and color), layout organization, and hyperlinking relevant resources, among others. The data processing system can transmit the formatted output message to the client system, associated with the client device, for presentation.

In some implementations, the data processing system can generate an output message based on a specific prompt and the corresponding language model. For example, if the user submits a prompt like, "Can you suggest a parlay for tonight's games featuring the Thunderbolts and the Steel Titans?", the data processing system can select the appropriate language model trained to generate wager recommendations. The language model can process the prompt and generate an output message such as, "Consider a parlay with the Thunderbolts to win and the Steel Titans to cover the spread at +6.5". The data processing system can format the output message for presentation in the graphical user interface on the client device.

D. Computing and Network Environment

Figure 4:
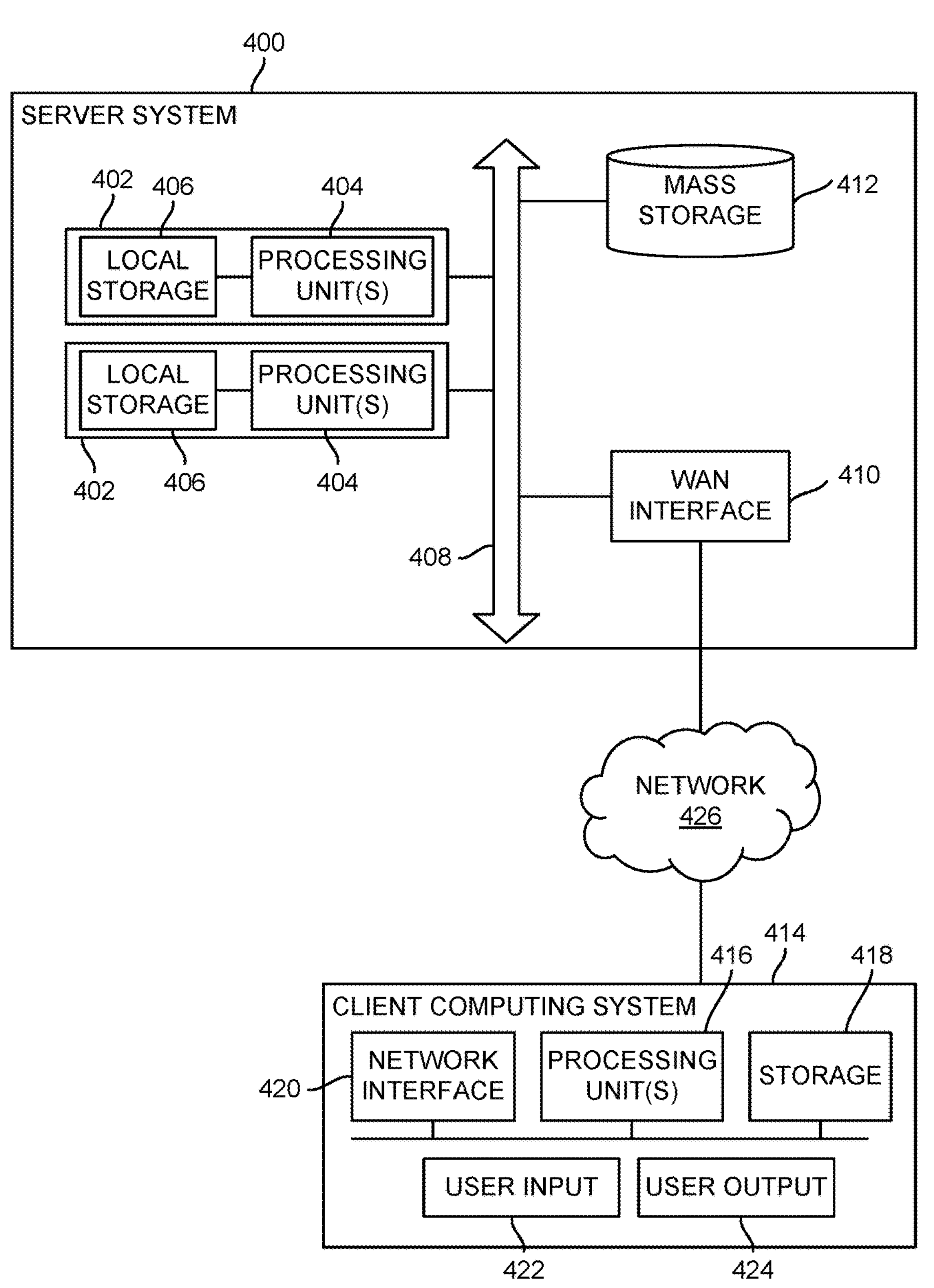
FIG. 4 illustrates a block diagram of a server system and a client computer system in accordance with an illustrative implementation.

Various operations described herein can be implemented on computer systems. FIG. 4 shows a simplified block diagram of a representative server system 400, client computer system 414, and network 426 usable to implement certain implementations of the present disclosure. In various implementations, server system 400 or similar systems can implement services or servers described herein or portions thereof. Client computer system 414 or similar systems can implement clients described herein. The system (e.g., the data processing system 104) and others described herein can be similar to the server system 400.

Server system 400 can have a modular design that incorporates a number of modules 402; while two modules 402 are shown, any number can be provided. Each module 402 can include processing unit(s) 404 and local storage 406.

Processing unit(s) 404 can include a single processor, which can have one or more cores, or multiple processors. In some implementations, processing unit(s) 404 can include a general-purpose primary processor as well as one or more special-purpose co-processors such as graphics processors, digital signal processors, or the like. In some implementations, some or all processing units 404 can be implemented using customized circuits, such as application specific integrated circuits (ASICs) or field programmable gate arrays (FPGAs). In some implementations, such integrated circuits execute instructions that are stored on the circuit itself. In other implementations, processing unit(s) 404 can execute instructions stored in local storage 406. Any type of processors in any combination can be included in processing unit(s) 404.

Local storage 406 can include volatile storage media (e.g., DRAM, SRAM, SDRAM, or the like) and/or non-volatile storage media (e.g., magnetic or optical disk, flash memory, or the like). Storage media incorporated in local storage 406 can be fixed, removable or upgradeable as desired. Local storage 406 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 404 need at runtime. The ROM can store static data and instructions that are needed by processing unit(s) 404. The permanent storage device can be a non-volatile read-and-write memory device that can store instructions and data even when module 402 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some implementations, local storage 406 can store one or more software programs to be executed by processing unit(s) 404, such as an operating system and/or programs implementing various server functions such as functions of the data processing systems 104 of FIG. 1 or any other system described herein, or any other server(s) associated with the data processing systems 104, or any other system described herein.

"Software" refers generally to sequences of instructions that, when executed by processing unit(s) 404 cause server system 400 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 404. Software can be implemented as a single program or a collection of separate programs or program modules that interact as desired. From local storage 406 (or non-local storage described below), processing unit(s) 404 can retrieve program instructions to execute and data to process in order to execute various operations described above.

In some server systems 400, multiple modules 402 can be interconnected via a bus or other interconnect 408, forming a local area network that supports communication between modules 402 and other components of server system 400. Interconnect 408 can be implemented using various technologies including server racks, hubs, routers, etc.

A wide area network (WAN) interface 410 can provide data communication capability between the local area network (interconnect 408) and the network 426, such as the Internet. Technologies can be used, including wired (e.g., Ethernet, IEEE 502.3 standards) and/or wireless technologies (e.g., Wi-Fi, IEEE 502.5 standards).

In some implementations, local storage 406 is intended to provide working memory for processing unit(s) 404, providing fast access to programs and/or data to be processed while reducing traffic on interconnect 408. Storage for larger quantities of data can be provided on the local area network by one or more mass storage subsystems 412 that can be connected to interconnect 408. Mass storage subsystem 412 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 412. In some implementations, additional data storage resources may be accessible via WAN interface 410 (potentially with increased latency).

Server system 400 can operate in response to requests received via WAN interface 410. For example, one of modules 402 can implement a supervisory function and assign discrete tasks to other modules 402 in response to received requests. Work allocation techniques can be used. As requests are processed, results can be returned to the requester via WAN interface 410. Such operation can generally be automated. Further, in some implementations, WAN interface 410 can connect multiple server systems 400 to each other, providing scalable systems capable of managing high volumes of activity. Techniques for managing server systems and server farms (collections of server systems that cooperate) can be used, including dynamic resource allocation and reallocation.

Server system 400 can interact with various user-owned or user-operated devices via a wide-area network such as the Internet. An example of a user-operated device is shown in FIG. 4 as client computing system 414. Client computing system 414 can be implemented, for example, as a consumer device such as a smartphone, other mobile phone, tablet computer, wearable computing device (e.g., smart watch, eyeglasses), desktop computer, laptop computer, and so on.

For example, client computing system 414 can communicate via WAN interface 410. Client computing system 414 can include computer components such as processing unit(s) 416, storage device 418, network interface 420, user input device 422, and user output device 424. Client computing system 414 can be a computing device implemented in a variety of form factors, such as a desktop computer, laptop computer, tablet computer, smartphone, other mobile computing device, wearable computing device, or the like.

Processor 416 and storage device 418 can be similar to processing unit(s) 404 and local storage 406 described above. Suitable devices can be selected based on the demands to be placed on client computing system 414; for example, client computing system 414 can be implemented as a "thin" client with limited processing capability or as a high-powered computing device. Client computing system 414 can be provisioned with program code executable by processing unit(s) 416 to enable various interactions with server system 400 of a message management service such as accessing messages, performing actions on messages, and other interactions described above. Some client computing systems 414 can also interact with a messaging service independently of the message management service.

Network interface 420 can provide a connection to the network 426, such as a wide area network (e.g., the Internet) to which WAN interface 410 of server system 400 is also connected. In various implementations, network interface 420 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 422 can include any device (or devices) via which a user can provide signals to client computing system 414; client computing system 414 can interpret the signals as indicative of particular user requests or information. In various implementations, user input device 422 can include any or all of a keyboard, touch pad, touch screen, mouse or other pointing device, scroll wheel, click wheel, dial, button, switch, keypad, microphone, and so on.

User output device 424 can include any device via which client computing system 414 can provide information to a user. For example, user output device 424 can include a display to display images generated by or delivered to client computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some implementations can include a device such as a touchscreen that function as both input and output device. In some implementations, other user output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 404 and 416 can provide various functionality for server system 400 and client computing system 414, including any of the functionality described herein as being performed by a server or client, or other functionality associated with message management services.

It will be appreciated that server system 400 and client computing system 414 are illustrative and that variations and modifications are possible. Computer systems used in connection with implementations of the present disclosure can have other capabilities not specifically described here. Further, while server system 400 and client computing system 414 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of these. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of these. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a player, implementations of the subject matter described in this specification can be implemented on a computer having a display device, e.g., a CRT (cathode ray tube), plasma, or LCD (liquid crystal display) monitor, for displaying information to the player and a keyboard and a pointing device, e.g., a mouse or a trackball, by which the player can provide input to the computer. Other kinds of devices can be used to provide for interaction with a player as well; for example, feedback provided to the player can include any form of sensory feedback, e.g., visual feedback, auditory feedback, or tactile feedback; and input from the player can be received in any form, including acoustic, speech, or tactile input. In addition, a computer can interact with a player by sending documents to and receiving documents from a device that is used by the player; for example, by sending web pages to a web browser on a player's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a player can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the system described herein can include clients and servers. For example, the system can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a player interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the system could be a single module, a logic device having one or more processing modules, one or more servers, or part of a search engine.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, elements, or acts of the systems and methods herein referred to in the singular may also embrace implementations including a plurality of these elements; and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or"may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for providing a system, the systems and methods described herein may be applied to other environments. The foregoing implementations are illustrative, rather than limiting, of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:

one or more processors coupled to non-transitory memory, the one or more processors configured to:

maintain, in one or more data structures, a plurality of wagering opportunities, each wagering opportunity corresponding to a respective sport domain of a plurality of sport domains;

receive, from a client device for a communication session, a prompt identifying a sports wagering request;

determine, by providing the prompt to at least one first classification model, i) a sport domain from the plurality of sport domains and ii) a classification of an intent corresponding to a first output type of a plurality of output types;

select a first language model of a plurality of language models based on i) the sport domain and ii) the classification of the intent of the prompt, the first language model fine-tuned on a first sport domain and a first classification of an intent such that the first language model is associated with a first sport and a first intent type, the first language model selected responsive to the sport domain and the classification of the intent matching the first sport and the first intent type of the first language model;

select, from the plurality of wagering opportunities, based on i) the prompt, ii) the sport domain, and iii) the classification of the intent, a subset of wagering opportunities corresponding to the sport domain and the classification of the intent, each wagering opportunity of the subset of wagering opportunities is available to place a wager;

generate, based on i) the prompt, ii) the sport domain, iii) the classification of the intent, and iv) the first language model, an input context comprising the prompt and identifying the subset of wagering opportunities selected from the plurality of wagering opportunities;

provide, as input to the first language model, the input context comprising the prompt and identifying the subset of wagering opportunities to generate a model output; and generate an output message using the model output of the first language model, the output message comprising data.

2. The system of claim 1, wherein the at least one first classification model is a machine-learning model.

3. The system of claim 2, wherein the machine-learning model comprises a second language model of the plurality of language models, the second language model different from the first language model.

4. The system of claim 1, wherein the one or more processors are to:

determine the classification of the intent based on a set of predetermined keywords.

5. The system of claim 1, wherein the one or more processors are to:

generate a data structure indicating the first language model is associated with the first intent type based on a plurality of historical prompts and a corresponding plurality of historical output messages generated by the first language model.

6. The system of claim 1, wherein the one or more processors are to:

maintain a plurality of adapters each respectively corresponding to the plurality of language models, a first adapter of the plurality of adapters corresponding to the first language model; and apply the first adapter to a base language model to generate the first language model.

7. The system of claim 6, wherein the first adapter comprises a low-rank adaptation data structure or a quantized low-rank adaptation data structure.

8. The system of claim 1, wherein a second intent type of a second language model of the plurality of language models corresponds to information requests, and wherein the first intent type of the first language model corresponds to recommendation requests.

9. The system of claim 1, wherein the one or more processors are to:

receive a second prompt corresponding to a second classification of a second intent;

select a second language model of the plurality of language models based on the second classification of the second intent, the second language model associated with a second intent type, the second language model selected responsive to the second classification of the second intent matching the second intent type of the second language model; and generate a second output message using the second prompt and the second language model.

10. The system of claim 9, wherein the one or more processors are to:

provide the output message to the client device for presentation in a graphical user interface in response to the prompt; and provide the second output message to the client device for presentation in the graphical user interface in response to the second prompt.

11. A method, comprising:

maintaining, by one or more processors coupled to non-transitory memory, in one or more data structures, a plurality of wagering opportunities, each wagering opportunity corresponding to a respective sport domain of a plurality of sport domains;

receiving, by the one or more processors, from a client device for a communication session, a prompt identifying a sports wagering request;

determining, by the one or more processors, by providing the prompt to at least one first classification model, i) a sport domain from the plurality of sport domains and ii) a classification of an intent corresponding to a first output type of a plurality of output types;

selecting, by the one or more processors, a first language model of a plurality of language models based on i) the sport domain and ii) the classification of the intent of the prompt, the first language model fine-tuned on a first sport domain and a first classification of an intent such that the first language model is associated with a first sport and a first intent type, the first language model selected responsive to the sport domain and the classification of the intent matching the first sport and the first intent type of the first language model;

selecting, by the one or more processors, from the plurality of wagering opportunities, based on i) the prompt, ii) the sport domain, and iii) the classification of the intent, a subset of wagering opportunities corresponding to the sport domain and the classification of the intent, each wagering opportunity of the subset of wagering opportunities is available to place a wager;

generating, by the one or more processors, based on i) the prompt, ii) the sport domain, iii) the classification of the intent, and iv) the first language model, an input context comprising the prompt and identifying the subset of wagering opportunities selected from the plurality of wagering opportunities;

providing by the one or more processors, as input to the first language model, the input context comprising the prompt and identifying the subset of wagering opportunities to generate a model output; and generating, by the one or more processors, an output message using the model output of the first language model, the output message comprising data.

12. The method of claim 11, wherein the at least one first classification model is a machine-learning model.

13. The method of claim 12, wherein the machine-learning model comprises a second language model of the plurality of language models, the second language model different from the first language model.

14. The method of claim 11, further comprising:

determining, by the one or more processors, the classification of the intent based on a set of predetermined keywords.

15. The method of claim 11, further comprising:

generating, by the one or more processors, a data structure indicating the first language model is associated with the first intent type based on a plurality of historical prompts and a corresponding plurality of historical output messages generated by the first language model.

16. The method of claim 11, further comprising:

maintaining, by the one or more processors, a plurality of adapters each respectively corresponding to the plurality of language models, a first adapter of the plurality of adapters corresponding to the first language model; and applying, by the one or more processors, the first adapter to a base language model to generate the first language model.

17. The method of claim 16, wherein the first adapter comprises a low-rank adaptation data structure or a quantized low-rank adaptation data structure.

18. The method of claim 11, wherein a second intent type of a second language model of the plurality of language models corresponds to information requests, and wherein the first intent type of the first language model corresponds to recommendation requests.

19. The method of claim 11, further comprising:

receiving, by the one or more processors, a second prompt corresponding to a second classification of a second intent;

selecting, by the one or more processors, a second language model of the plurality of language models based on the second classification of the second intent, the second language model associated with a second intent type, the second language model selected responsive to the second classification of the second intent matching the second intent type of the second language model; and generating, by the one or more processors, a second output message using the second prompt and the second language model.

20. The method of claim 19, further comprising:

providing, by the one or more processors, the output message to the client device for presentation in a graphical user interface in response to the prompt; and providing, by the one or more processors, the second output message to the client device for presentation in the graphical user interface in response to the second prompt.

* * * * *